(12) United States Patent
Mercier et al.

(10) Patent No.: US 10,702,076 B2
(45) Date of Patent: Jul. 7, 2020

(54) SENSORS, DEVICES, ADAPTERS AND MATING STRUCTURES FOR MERCHANDISERS AND RELATED METHODS

(71) Applicant: Atlas Bolt & Screw Company LLC, Ashland, OH (US)

(72) Inventors: Michael William Mercier, Chicago, IL (US); Daniel Davenport, Chicago, IL (US)

(73) Assignee: Atlas Bolt & Screw Company LLC, Ashland, OH (US)

( * ) Notice: Subject to any disclaimer, the term of this patent is extended or adjusted under 35 U.S.C. 154(b) by 297 days.

(21) Appl. No.: 15/409,396

(22) Filed: Jan. 18, 2017

(65) Prior Publication Data

US 2017/0202369 A1 Jul. 20, 2017

Related U.S. Application Data

(60) Provisional application No. 62/440,993, filed on Dec. 30, 2016, provisional application No. 62/279,931, filed on Jan. 18, 2016.

(51) Int. Cl.
| | |
|---|---|
| *A47F 1/12* | (2006.01) |
| *A47F 5/08* | (2006.01) |
| *G06Q 40/00* | (2012.01) |
| *G06Q 10/08* | (2012.01) |
| *G01B 21/16* | (2006.01) |

(52) U.S. Cl.
CPC ............ *A47F 1/126* (2013.01); *A47F 5/083* (2013.01); *G01B 21/16* (2013.01); *G06Q 10/087* (2013.01); *G06Q 40/12* (2013.12)

(58) Field of Classification Search
CPC ......... A47F 1/126; A47F 5/083; G01B 21/16; G06Q 10/087; G06Q 40/12
See application file for complete search history.

(56) References Cited

U.S. PATENT DOCUMENTS

| | | | |
|---|---|---|---|
| 2,510,944 A | 6/1950 | Auerbach | |
| 2,598,862 A | 6/1952 | Tonn | |

(Continued)

FOREIGN PATENT DOCUMENTS

| | | |
|---|---|---|
| CA | 2781515 A1 | 12/2012 |
| CN | 2781936 Y | 5/2006 |

(Continued)

OTHER PUBLICATIONS

"Introducing Smart Shelf". Newave Sensor Solutions. Retrieved from <http://www.newaverfid.com/Portals/0/Resources/NeWave_SS_Overview_Dec_2015.pdf>. Dec. 2015. (Year: 2015).*

(Continued)

*Primary Examiner* — Nathan A Mitchell
(74) *Attorney, Agent, or Firm* — Levenfeld Pearlstein, LLC

(57) ABSTRACT

A product display merchandiser comprising a track, a pusher configured to move along the track, a biasing mechanism configured to apply a force on the pusher in one direction along the track, and a distance sensor configured to detect the distance between the pusher and a fixed point. The distance sensor determines the number of products contained in the product display merchandiser based on the distance measured.

25 Claims, 27 Drawing Sheets

(56) References Cited

U.S. PATENT DOCUMENTS

| | | | |
|---|---|---|---|
| 2,674,723 A | 4/1954 | Hurlbut | |
| 2,755,452 A | 7/1956 | Rogie | |
| 3,605,064 A | 9/1971 | Routh | |
| 3,622,938 A | 11/1971 | Ito | |
| 3,886,348 A | 5/1975 | Jonathan | |
| 4,018,497 A | 4/1977 | Bulanchuk | |
| 4,042,291 A | 8/1977 | Moriyama | |
| 4,245,874 A | 1/1981 | Bishop | |
| 4,502,103 A | 2/1985 | Collins | |
| 4,652,973 A * | 3/1987 | Baker | H05K 7/1061 |
| | | | 361/718 |
| 4,688,869 A | 8/1987 | Kelly | |
| 4,689,726 A | 8/1987 | Kretzschmar | |
| 4,736,279 A | 4/1988 | Yamai | |
| 4,747,025 A | 5/1988 | Barton | |
| 4,799,133 A | 1/1989 | Strzalko | |
| 4,886,462 A | 12/1989 | Fierro | |
| 4,973,796 A | 11/1990 | Dougherty | |
| 4,994,943 A | 2/1991 | Aspenwall | |
| 4,996,636 A | 2/1991 | Lovett | |
| 5,012,936 A | 5/1991 | Crum | |
| 5,022,720 A | 6/1991 | Fevig | |
| 5,034,861 A | 7/1991 | Sklenak | |
| 5,072,343 A | 12/1991 | Buers | |
| D330,090 S | 10/1992 | Walter | |
| 5,154,641 A | 10/1992 | McLaughlin | |
| 5,190,186 A | 3/1993 | Yablans | |
| 5,205,638 A | 4/1993 | Squitieri | |
| 5,334,037 A | 8/1994 | Gabrius | |
| 5,348,485 A | 9/1994 | Briechle | |
| 5,366,099 A | 11/1994 | Schmid | |
| 5,390,802 A | 2/1995 | Pappagallo | |
| 5,425,648 A | 6/1995 | Farham | |
| 5,476,396 A | 12/1995 | De Castro | |
| 5,542,552 A | 8/1996 | Yablans | |
| 5,553,412 A | 9/1996 | Briechle | |
| 5,605,237 A | 2/1997 | Richardson | |
| 5,608,643 A | 3/1997 | Wichter | |
| 5,639,258 A | 6/1997 | Clark | |
| 5,649,363 A | 7/1997 | Rankin, VI | |
| 5,665,304 A | 9/1997 | Heinen | |
| 5,671,362 A | 9/1997 | Cowe | |
| 5,685,664 A | 11/1997 | Parham | |
| 5,690,415 A | 11/1997 | Krehl | |
| 5,722,747 A | 3/1998 | Baron | |
| 5,722,847 A | 3/1998 | Haag | |
| 5,743,428 A | 4/1998 | Rankin, VI | |
| 5,758,585 A | 6/1998 | Latchinian | |
| 5,791,487 A | 8/1998 | Dixon | |
| 5,816,696 A | 10/1998 | Beisler | |
| 5,831,515 A | 11/1998 | Stewart | |
| 5,839,588 A | 11/1998 | Hawkinson | |
| 5,855,281 A | 1/1999 | Rabas | |
| 5,855,283 A | 1/1999 | Johnson | |
| 5,881,910 A | 3/1999 | Rein | |
| 5,894,933 A | 4/1999 | Crews | |
| 5,902,034 A | 5/1999 | Santosuosso | |
| 5,902,150 A | 5/1999 | Sigl | |
| 5,915,824 A | 6/1999 | Straat | |
| 5,924,790 A | 7/1999 | Ponton | |
| 5,964,373 A | 10/1999 | Hucknall | |
| 5,992,652 A | 11/1999 | Springs | |
| 6,093,037 A | 7/2000 | Lin | |
| 6,142,317 A | 11/2000 | Merl | |
| 6,155,438 A | 12/2000 | Close | |
| 6,179,434 B1 | 1/2001 | Saraiji | |
| 6,181,299 B1 | 1/2001 | Frederick | |
| 6,196,648 B1 | 3/2001 | Henriott | |
| 6,227,385 B1 | 5/2001 | Nickerson | |
| 6,231,205 B1 | 5/2001 | Slesinger | |
| D445,615 S | 7/2001 | Burke | |
| 6,254,247 B1 | 7/2001 | Carson | |
| 6,259,965 B1 | 7/2001 | Steele | |
| 6,269,285 B1 | 7/2001 | Mignault | |
| 6,276,810 B1 | 8/2001 | Vosshenrich | |
| 6,283,608 B1 | 9/2001 | Straat | |
| 6,302,557 B1 | 10/2001 | Santosuosso | |
| 6,325,523 B1 | 12/2001 | Santosuosso | |
| 6,341,271 B1 * | 1/2002 | Salvo | G06Q 10/087 |
| | | | 705/28 |
| 6,351,964 B1 | 3/2002 | Brancheau | |
| 6,364,273 B1 | 4/2002 | Otema | |
| 6,375,015 B1 | 4/2002 | Wingate | |
| 6,382,431 B1 | 5/2002 | Burke | |
| 6,409,028 B2 | 6/2002 | Nickerson | |
| 6,430,467 B1 | 8/2002 | D'Amelio | |
| 6,443,317 B1 | 9/2002 | Brozak, Jr. | |
| 6,464,089 B1 | 10/2002 | Rankin, VI | |
| 6,484,891 B2 | 11/2002 | Burke | |
| 6,502,012 B1 | 12/2002 | Nelson | |
| 6,527,565 B1 | 3/2003 | Johns | |
| 6,539,280 B1 | 3/2003 | Valiulis | |
| 6,550,269 B2 | 4/2003 | Rudick | |
| 6,558,017 B1 | 5/2003 | Saraiji | |
| 6,561,617 B2 | 5/2003 | Silverbrook | |
| 6,599,145 B2 | 7/2003 | Singh | |
| 6,622,874 B1 | 9/2003 | Hawkinson | |
| 6,671,578 B1 | 12/2003 | D'Amelio | |
| 6,684,126 B2 | 1/2004 | Omura | |
| 6,735,498 B2 | 5/2004 | Hertz | |
| 6,749,207 B2 | 6/2004 | Nadeau | |
| D493,009 S | 7/2004 | Ken | |
| 6,772,888 B2 | 8/2004 | Burke | |
| 6,808,407 B1 | 10/2004 | Cannon | |
| 6,827,463 B2 | 12/2004 | Chuang | |
| 6,827,465 B2 | 12/2004 | Shemitz | |
| 6,859,677 B2 | 2/2005 | Mitterholzer | |
| 6,886,699 B2 | 5/2005 | Johnson | |
| 6,918,679 B2 | 7/2005 | Wu | |
| 7,028,852 B2 | 4/2006 | Johnson et al. | |
| D521,286 S | 5/2006 | Colmenares | |
| 7,036,947 B2 | 5/2006 | Chuang | |
| 7,056,007 B2 | 6/2006 | Chiu | |
| 7,061,381 B2 * | 6/2006 | Forcier | A01K 15/023 |
| | | | 340/568.1 |
| 7,066,342 B2 | 6/2006 | Baechle | |
| 7,111,735 B2 | 9/2006 | Lowry | |
| 7,121,675 B2 | 10/2006 | Ter-Hovhannisian | |
| 7,124,898 B2 | 10/2006 | Richter et al. | |
| 7,137,517 B2 | 11/2006 | Lowry | |
| 7,163,305 B2 | 1/2007 | Bienick | |
| 7,168,579 B2 | 1/2007 | Richter et al. | |
| 7,175,034 B2 | 2/2007 | Nook | |
| 7,184,857 B1 | 2/2007 | Hertz | |
| 7,195,123 B2 | 3/2007 | Roslof et al. | |
| 7,233,241 B2 * | 6/2007 | Overhultz | A47F 10/02 |
| | | | 211/59.2 |
| 7,286,696 B2 | 10/2007 | Erickson | |
| 7,289,656 B2 | 10/2007 | Engelbart | |
| 7,293,663 B2 | 11/2007 | Lavery | |
| 7,347,335 B2 | 3/2008 | Rankin, VI | |
| 7,367,685 B2 | 5/2008 | Moll | |
| 7,419,062 B2 | 9/2008 | Mason | |
| 7,428,327 B2 | 9/2008 | Erickson | |
| 7,434,951 B2 | 10/2008 | Bienick | |
| 7,463,368 B2 | 12/2008 | Morden | |
| 7,477,780 B2 | 1/2009 | Boncyk | |
| 7,513,637 B2 | 4/2009 | Kelly | |
| 7,529,597 B1 | 5/2009 | Hertz | |
| 7,535,337 B2 | 5/2009 | Overhultz | |
| 7,545,517 B2 | 6/2009 | Rueb | |
| 7,551,765 B2 | 6/2009 | Thomas | |
| 7,574,822 B2 | 8/2009 | Moore | |
| 7,597,448 B1 | 10/2009 | Zarian | |
| 7,597,462 B2 | 10/2009 | Misof | |
| 7,600,887 B2 | 10/2009 | Sherman | |
| 7,614,350 B2 | 11/2009 | Tuttle | |
| 7,614,761 B2 | 11/2009 | Tanaka | |
| 7,641,072 B1 | 1/2010 | Vlastakis | |
| 7,664,305 B2 | 2/2010 | Erickson | |
| 7,681,744 B2 | 3/2010 | Johnson | |
| 7,681,745 B2 | 3/2010 | Richter | |
| 7,689,460 B2 | 3/2010 | Natori | |
| 7,693,757 B2 | 4/2010 | Zimmerman | |

(56) References Cited

U.S. PATENT DOCUMENTS

| | | |
|---|---|---|
| 7,703,614 B2 | 4/2010 | Schneider |
| 7,726,831 B2 | 6/2010 | Shibusawa |
| 7,758,233 B2 | 7/2010 | Chang |
| 7,766,502 B2 | 8/2010 | Tress |
| 7,792,711 B2 | 9/2010 | Swafford |
| 7,794,132 B2 | 9/2010 | Cunius |
| 7,806,543 B2 | 10/2010 | Swofford |
| 7,823,734 B2 | 11/2010 | Hardy |
| 7,824,055 B2 | 11/2010 | Sherman |
| 7,824,056 B2 | 11/2010 | Madireddi |
| 7,824,057 B2 | 11/2010 | Shibusawa |
| 7,854,334 B2 | 12/2010 | Nagel |
| 7,871,176 B2 | 1/2011 | Kelly |
| 7,909,183 B2 | 3/2011 | Oh |
| 7,929,750 B2 | 4/2011 | Erickson |
| 7,940,181 B2 | 5/2011 | Ramachandra |
| 7,949,568 B2 | 5/2011 | Fano |
| 7,950,817 B2 | 5/2011 | Zulim |
| 7,954,979 B2 | 6/2011 | Sommers |
| 7,976,181 B2 | 7/2011 | Kelly |
| 8,002,181 B2 | 8/2011 | Ulrich |
| 8,002,441 B2 | 8/2011 | Barkdoll |
| 8,009,864 B2 | 8/2011 | Linaker |
| 8,047,657 B2 | 11/2011 | Ikeda |
| 8,066,398 B2 | 11/2011 | Hartman |
| 8,068,659 B2 | 11/2011 | Engelbart |
| 8,070,309 B2 | 12/2011 | Otsuki |
| 8,075,160 B1 | 12/2011 | Zarian |
| 8,083,078 B2 | 12/2011 | Omura |
| 8,113,678 B2 | 2/2012 | Babcock |
| 8,118,164 B2 | 2/2012 | Brown |
| 8,131,055 B2 | 3/2012 | Clarke |
| 8,136,956 B2 | 3/2012 | Oketani |
| 8,142,047 B2 | 3/2012 | Acampora |
| 8,164,274 B2 | 4/2012 | Pas |
| 8,172,096 B2 | 5/2012 | Van De Steen |
| 8,177,404 B2 | 5/2012 | Weng |
| 8,189,855 B2 | 5/2012 | Opalach |
| 8,190,289 B2 | 5/2012 | Lockwood |
| 8,190,497 B2 | 5/2012 | O'Dell |
| 8,210,367 B2 | 7/2012 | Nagel |
| 8,215,795 B2 | 7/2012 | Pichel |
| 8,224,720 B2 | 7/2012 | Cohen |
| 8,260,456 B2 | 9/2012 | Siegel |
| 8,292,095 B2 | 10/2012 | Howlett |
| 8,319,607 B2 | 11/2012 | Grimlund |
| 8,353,425 B2 | 1/2013 | Lockwood |
| 8,386,075 B2 | 2/2013 | Lockwood |
| 8,413,826 B2 | 4/2013 | Schneider |
| 8,413,843 B2 | 4/2013 | Vardaro |
| 8,419,205 B1 | 4/2013 | Schmuckle |
| 8,429,004 B2 | 4/2013 | Hamilton |
| 8,433,432 B2 | 4/2013 | Matsushita |
| 8,443,988 B2 | 5/2013 | Niederhuefner |
| 8,448,815 B2 | 5/2013 | Sholl |
| 8,453,851 B2 | 6/2013 | Ciesick |
| 8,490,424 B2 | 7/2013 | Roche |
| 8,506,109 B2 | 8/2013 | Stukenberg |
| 8,545,045 B2 | 10/2013 | Tress |
| 8,562,167 B1 | 10/2013 | Meier |
| 8,581,738 B2 | 11/2013 | Maggiore |
| 8,602,230 B2 | 12/2013 | Bergdoll |
| 8,607,997 B2 | 12/2013 | Bergdoll |
| 8,616,757 B2 | 12/2013 | Leadford |
| 8,630,924 B2 | 1/2014 | Groenevelt |
| 8,631,956 B2 | 1/2014 | Dowd |
| 8,646,935 B2 | 2/2014 | Karan |
| 8,651,296 B2 | 2/2014 | Beaty |
| 8,676,377 B2 | 3/2014 | Siegel |
| 8,678,232 B2 | 3/2014 | Mockus |
| 8,684,268 B2 | 4/2014 | Pas |
| 8,695,878 B2 | 4/2014 | Burnside |
| 8,720,702 B2 | 5/2014 | Nagel |
| 8,746,916 B2 | 6/2014 | Oketani |
| 8,800,811 B2 | 8/2014 | Sherretts |
| 8,812,378 B2 | 8/2014 | Swafford |
| 8,814,399 B2 | 8/2014 | Osawa |
| 8,820,545 B2 | 9/2014 | Kologe |
| 8,823,355 B2 | 9/2014 | Hachmann |
| 8,823,521 B2 | 9/2014 | Overhultz |
| 8,858,013 B2 | 10/2014 | Attey |
| 8,864,334 B2 | 10/2014 | Swafford, Jr. |
| 8,908,903 B2 | 12/2014 | Deng |
| 8,910,801 B2 | 12/2014 | Johnson |
| 8,925,745 B2 | 1/2015 | Theisen |
| 8,938,396 B2 | 1/2015 | Swafford |
| 8,939,779 B1 | 1/2015 | Lindblom |
| 8,941,495 B2 | 1/2015 | Wiese |
| 8,941,645 B2 | 1/2015 | Grimaud |
| 8,972,291 B2 | 3/2015 | Rimnac |
| 8,978,901 B2 | 3/2015 | Hogeback |
| 8,978,903 B2 | 3/2015 | Hardy |
| 8,978,904 B2 | 3/2015 | Hardy |
| 8,979,296 B2 | 3/2015 | Wiemer |
| 8,985,352 B2 | 3/2015 | Bergdoll |
| 8,998,005 B2 | 4/2015 | Hardy |
| 9,016,484 B2 | 4/2015 | Kologe |
| 9,022,637 B2 | 5/2015 | Meyer |
| 9,033,239 B2 | 5/2015 | Winkel |
| 9,038,833 B2 | 5/2015 | Ciesick |
| 9,044,089 B1 | 6/2015 | Sandhu |
| 9,044,105 B2 | 6/2015 | McClaughry |
| 9,052,994 B2 | 6/2015 | Lockwood |
| 9,057,513 B2 | 6/2015 | Lindblom |
| 9,070,261 B2 | 6/2015 | Hardy |
| 9,072,394 B2 | 7/2015 | Hardy |
| 9,091,587 B2 | 7/2015 | Kawamura |
| 9,101,230 B2 | 8/2015 | Sosso |
| 9,107,497 B1 | 8/2015 | Al-Habsi |
| 9,107,515 B2 | 8/2015 | Hardy |
| 9,119,488 B2 | 9/2015 | Lockwood |
| 9,121,583 B2 | 9/2015 | Takeuchi |
| 9,129,494 B2 | 9/2015 | Valiulis |
| 9,131,787 B2 | 9/2015 | Berglund |
| 9,138,075 B2 | 9/2015 | Hardy |
| 9,138,076 B2 | 9/2015 | Hardy |
| 9,149,130 B2 | 10/2015 | Yuen |
| 9,149,132 B2 | 10/2015 | Hardy |
| 9,167,914 B2 | 10/2015 | Rankin, VI |
| 9,179,788 B2 | 11/2015 | Hardy |
| 9,185,999 B2 | 11/2015 | Hardy |
| 9,188,291 B2 | 11/2015 | Cassidy |
| 9,204,736 B2 | 12/2015 | Lindblom |
| 9,222,645 B2 | 12/2015 | Breslow |
| 9,228,735 B2 | 1/2016 | Liu |
| 9,239,136 B1 | 1/2016 | Petersen |
| 9,254,049 B2 | 2/2016 | Nagel |
| 9,279,544 B1 | 3/2016 | Dankelmann |
| 9,364,100 B2 | 6/2016 | Browning |
| 9,367,831 B1* | 6/2016 | Besehanic ............ G06Q 10/087 |
| 9,384,684 B2 | 7/2016 | Theisen |
| 9,404,645 B1 | 8/2016 | Feng |
| 9,424,446 B2 | 8/2016 | Baarman |
| 9,456,704 B2 | 10/2016 | Bhargava |
| 9,483,896 B2 | 11/2016 | Lockwood |
| 9,509,110 B1 | 11/2016 | Buck |
| 9,576,417 B2* | 2/2017 | Christianson ............ G07F 11/38 |
| 9,691,308 B2 | 6/2017 | Meyer |
| 9,775,447 B2 | 10/2017 | Wiemer |
| 9,829,178 B2 | 11/2017 | Breslow |
| 9,986,852 B2 | 6/2018 | Chenoweth |
| 10,064,502 B1* | 9/2018 | Gyori ...................... A47F 5/16 |
| 10,271,666 B2* | 4/2019 | Taylor ..................... A47F 1/125 |
| 2002/0146282 A1 | 10/2002 | Wilkes |
| 2002/0147597 A1 | 10/2002 | Connors et al. |
| 2002/0171335 A1 | 11/2002 | Held |
| 2003/0056697 A1 | 3/2003 | Bowmar et al. |
| 2003/0057167 A1 | 3/2003 | Johnson et al. |
| 2003/0200688 A1 | 10/2003 | Richter |
| 2003/0217980 A1 | 11/2003 | Johnson et al. |
| 2004/0050811 A1 | 3/2004 | Leahy |
| 2004/0073334 A1 | 4/2004 | Terranova |
| 2004/0117243 A1 | 6/2004 | Chepil |
| 2004/0208372 A1 | 10/2004 | Boncyk |

(56) References Cited

U.S. PATENT DOCUMENTS

| | | |
|---|---|---|
| 2005/0040123 A1* | 2/2005 | Ali .................... A47F 1/126 211/59.3 |
| 2005/0072747 A1 | 4/2005 | Roslof et al. |
| 2005/0171854 A1 | 8/2005 | Lyon |
| 2005/0173605 A1 | 8/2005 | Villeneuve |
| 2005/0189310 A1 | 9/2005 | Richter et al. |
| 2005/0199563 A1 | 9/2005 | Richter et al. |
| 2005/0199564 A1 | 9/2005 | Johnson et al. |
| 2005/0199565 A1 | 9/2005 | Richter et al. |
| 2005/0254262 A1 | 11/2005 | Chiu |
| 2005/0279722 A1 | 12/2005 | Ali |
| 2006/0013070 A1* | 1/2006 | Holm .................... G01S 5/0081 367/128 |
| 2006/0067089 A1 | 3/2006 | Hocquard |
| 2006/0071774 A1 | 4/2006 | Brown |
| 2006/0097875 A1 | 5/2006 | Ott |
| 2006/0207778 A1 | 9/2006 | Walter |
| 2007/0022644 A1 | 2/2007 | Lynch |
| 2007/0042614 A1 | 2/2007 | Marmaropoulos |
| 2007/0272634 A1 | 11/2007 | Scott |
| 2007/0273513 A1 | 11/2007 | White |
| 2007/0290585 A1 | 12/2007 | Moeller |
| 2008/0055914 A1 | 3/2008 | O'Rourke |
| 2008/0077510 A1 | 3/2008 | Dielemans |
| 2008/0083353 A1 | 4/2008 | Tuttle |
| 2008/0121146 A1 | 5/2008 | Burns |
| 2008/0144934 A1 | 6/2008 | Raynaud |
| 2008/0151535 A1 | 6/2008 | De Castris |
| 2008/0156752 A1 | 7/2008 | Bryson et al. |
| 2008/0277361 A1 | 11/2008 | Primiano |
| 2008/0278932 A1 | 11/2008 | Tress |
| 2008/0306787 A1 | 12/2008 | Hamilton |
| 2009/0037244 A1 | 2/2009 | Pemberton |
| 2009/0039040 A1 | 2/2009 | Johnson |
| 2009/0223916 A1 | 9/2009 | Kahl |
| 2009/0248198 A1* | 10/2009 | Siegel .................... G06Q 10/08 700/231 |
| 2009/0279295 A1 | 11/2009 | Van Der Poel |
| 2010/0087953 A1 | 4/2010 | Garson |
| 2010/0089846 A1 | 4/2010 | Navarro Ruiz |
| 2010/0102685 A1 | 4/2010 | Ward |
| 2010/0103701 A1 | 4/2010 | Bartlett |
| 2010/0107670 A1 | 5/2010 | Kottke et al. |
| 2010/0195317 A1 | 8/2010 | Oketani |
| 2010/0201522 A1 | 8/2010 | White |
| 2011/0044030 A1 | 2/2011 | Pichel |
| 2011/0055103 A1* | 3/2011 | Swafford, Jr. .......... A47F 1/126 705/345 |
| 2011/0203148 A1 | 8/2011 | Li |
| 2011/0203496 A1 | 8/2011 | Garneau |
| 2011/0204009 A1 | 8/2011 | Karan |
| 2011/0215060 A1 | 9/2011 | Niederhuefner |
| 2011/0218889 A1 | 9/2011 | Westberg |
| 2011/0273867 A1 | 11/2011 | Horst |
| 2011/0304316 A1 | 12/2011 | Hachmann |
| 2012/0068942 A1* | 3/2012 | Lauder .................... H01F 7/04 345/173 |
| 2012/0091162 A1* | 4/2012 | Overhultz .............. A47F 1/126 221/1 |
| 2012/0230018 A1 | 9/2012 | Wiemer |
| 2012/0233041 A1 | 9/2012 | O'Dell |
| 2012/0245969 A1* | 9/2012 | Campbell ............ G06Q 10/087 705/7.11 |
| 2012/0274189 A1 | 11/2012 | Attey |
| 2012/0279934 A1 | 11/2012 | Thomas |
| 2012/0281095 A1 | 11/2012 | Trenciansky |
| 2012/0295560 A1* | 11/2012 | Mufti .................... H04B 13/00 455/95 |
| 2012/0308969 A1 | 12/2012 | Rataul |
| 2012/0310398 A1 | 12/2012 | Rataul |
| 2012/0310570 A1 | 12/2012 | Pyne |
| 2013/0002422 A1* | 1/2013 | Wiese .................... G08B 13/08 340/539.1 |
| 2013/0024023 A1 | 1/2013 | Siegel |
| 2013/0107498 A1 | 5/2013 | McClaughry |
| 2013/0107501 A1 | 5/2013 | Ewald |
| 2013/0144416 A1 | 6/2013 | Rataul |
| 2013/0155815 A1 | 6/2013 | Wulff |
| 2013/0176398 A1 | 7/2013 | Bonner |
| 2013/0226742 A1 | 8/2013 | Johnson |
| 2013/0229789 A1 | 9/2013 | Yoshida |
| 2013/0233922 A1* | 9/2013 | Schoening .......... G06Q 10/087 235/385 |
| 2013/0238516 A1 | 9/2013 | Moock |
| 2013/0286651 A1 | 10/2013 | Takeuchi |
| 2013/0299439 A1 | 11/2013 | Sid |
| 2013/0337668 A1 | 12/2013 | Ernest |
| 2013/0341292 A1 | 12/2013 | Johnson |
| 2013/0343014 A1 | 12/2013 | Browning |
| 2014/0006229 A1 | 1/2014 | Birch |
| 2014/0008382 A1 | 1/2014 | Christianson |
| 2014/0009372 A1 | 1/2014 | Fernando |
| 2014/0032379 A1 | 1/2014 | Schuetz |
| 2014/0055978 A1 | 2/2014 | Gantz |
| 2014/0055987 A1 | 2/2014 | Lindblom |
| 2014/0057604 A1 | 2/2014 | Kolanowski |
| 2014/0104826 A1 | 4/2014 | Bergdoll |
| 2014/0110481 A1 | 4/2014 | Burnside |
| 2014/0129395 A1 | 5/2014 | Groenovelt |
| 2014/0153279 A1 | 6/2014 | Weyer |
| 2014/0175034 A1 | 6/2014 | Hardy |
| 2014/0176164 A1* | 6/2014 | Davis .................... A46B 9/028 324/709 |
| 2014/0184818 A1* | 7/2014 | Argue .................. G06Q 10/087 348/207.1 |
| 2014/0201040 A1 | 7/2014 | Birch |
| 2014/0201041 A1* | 7/2014 | Meyer .................. G06Q 10/087 705/28 |
| 2014/0201042 A1 | 7/2014 | Meyer |
| 2014/0207606 A1 | 7/2014 | Harrison |
| 2014/0224875 A1 | 8/2014 | Slesinger |
| 2014/0254136 A1 | 9/2014 | Oraw |
| 2014/0291346 A1 | 10/2014 | Mockus |
| 2014/0299620 A1 | 10/2014 | Swafford |
| 2014/0305889 A1 | 10/2014 | Vogler |
| 2014/0316916 A1 | 10/2014 | Hay |
| 2014/0324642 A1 | 10/2014 | Winkel |
| 2014/0333541 A1 | 11/2014 | Lee |
| 2014/0344118 A1 | 11/2014 | Parpia |
| 2014/0353265 A1 | 12/2014 | Rankin, VI |
| 2014/0367401 A1* | 12/2014 | Stralin .................... A47K 10/22 221/6 |
| 2015/0024615 A1 | 1/2015 | Lindblom |
| 2015/0026020 A1 | 1/2015 | Overhultz |
| 2015/0036326 A1 | 2/2015 | Maciulewicz |
| 2015/0046299 A1 | 2/2015 | Yan |
| 2015/0053237 A1 | 2/2015 | Lee |
| 2015/0055328 A1 | 2/2015 | Irii |
| 2015/0070928 A1 | 3/2015 | Rau |
| 2015/0073947 A1 | 3/2015 | Higgins |
| 2015/0076093 A1 | 3/2015 | Theisen |
| 2015/0079823 A1 | 3/2015 | Lindblom |
| 2015/0088306 A1* | 3/2015 | Varrasso .............. G06Q 20/203 700/236 |
| 2015/0088701 A1 | 3/2015 | Desmarais |
| 2015/0088703 A1 | 3/2015 | Yan |
| 2015/0123973 A1 | 5/2015 | Larsen |
| 2015/0125835 A1 | 5/2015 | Wittich |
| 2015/0128398 A1 | 5/2015 | Benlevi |
| 2015/0134403 A1 | 5/2015 | Schwartz |
| 2015/0157142 A1 | 6/2015 | Turner et al. |
| 2015/0160651 A1 | 6/2015 | Tateno |
| 2015/0173529 A1 | 6/2015 | Hester-Redmond |
| 2015/0193723 A1 | 7/2015 | Carbonell |
| 2015/0193759 A1 | 7/2015 | Fukuda |
| 2015/0235502 A1 | 8/2015 | Lockwood |
| 2015/0241034 A1 | 8/2015 | Dankelmann |
| 2015/0241035 A1 | 8/2015 | Dankelmann |
| 2015/0289680 A1 | 10/2015 | Sosso |
| 2015/0365384 A1* | 12/2015 | Rider Jimenez .... H04L 63/0435 705/77 |
| 2016/0061429 A1 | 3/2016 | Waalkes |
| 2016/0091177 A1 | 3/2016 | Houle |

(56) References Cited

U.S. PATENT DOCUMENTS

| | | | |
|---|---|---|---|
| 2016/0097516 A1 | 4/2016 | Howard | |
| 2016/0104985 A1 | 4/2016 | Ewing | |
| 2016/0132822 A1* | 5/2016 | Swafford | H04W 4/80 705/28 |
| 2016/0157635 A1 | 6/2016 | Hardy | |
| 2016/0174733 A1 | 6/2016 | Cinici | |
| 2016/0209941 A1 | 7/2016 | Hadas | |
| 2016/0213168 A1 | 7/2016 | Nuttall | |
| 2016/0239795 A1* | 8/2016 | Burch, V | G06F 16/254 |
| 2016/0313051 A1 | 10/2016 | Alt | |
| 2017/0273477 A1 | 1/2017 | Mercier et al. | |
| 2017/0193436 A1* | 7/2017 | Taylor | G01S 3/80 |
| 2017/0237843 A1* | 8/2017 | Ackeret | H04M 1/04 455/575.9 |
| 2017/0293880 A1* | 10/2017 | Taylor | G06Q 10/087 |
| 2018/0047243 A1 | 2/2018 | Swafford, Jr. | |
| 2018/0107973 A1 | 4/2018 | Overhultz | |
| 2018/0144288 A1* | 5/2018 | Sayed | G06Q 10/087 |

FOREIGN PATENT DOCUMENTS

| | | |
|---|---|---|
| CN | 101574214 | 11/2009 |
| CN | 202681155 U | 1/2013 |
| CN | 204862262 | 12/2015 |
| CN | 205560499 U | 9/2016 |
| DE | 19531866 | 2/1997 |
| DE | 20111800 | 10/2001 |
| DE | 10153495 A1 | 5/2003 |
| DE | 102010050500 | 5/2012 |
| DE | 202014001867 U1 | 3/2014 |
| EP | 268209 A2 | 5/1988 |
| EP | 0441354 A1 | 8/1991 |
| EP | 0683998 | 11/1995 |
| EP | 1057164 A1 | 12/2000 |
| EP | 1541064 A1 | 6/2005 |
| EP | 1579789 A1 | 9/2005 |
| EP | 2220965 | 8/2010 |
| EP | 2292120 | 3/2011 |
| EP | 2732729 A1 | 5/2014 |
| GB | 2291788 | 2/1996 |
| GB | 2297896 | 8/1996 |
| GB | 2325148 | 11/1998 |
| GB | 2359405 | 8/2001 |
| GB | 2360514 A | 9/2001 |
| GB | 2390214 A | 12/2003 |
| RU | 2014112705 | 10/2015 |
| TW | 201513811 A | 4/2015 |
| WO | 1995016375 | 6/1995 |
| WO | 9708667 | 3/1997 |
| WO | 9908950 | 2/1999 |
| WO | 2000024297 A1 | 5/2000 |
| WO | 2003060839 | 7/2003 |
| WO | 03079852 A1 | 10/2003 |
| WO | 2005023060 A1 | 3/2005 |
| WO | 2006023954 | 3/2006 |
| WO | 2006067396 | 6/2006 |
| WO | 2007140161 | 12/2007 |
| WO | 2007146740 | 12/2007 |
| WO | 2008152973 A1 | 12/2008 |
| WO | 2010024507 A1 | 3/2010 |
| WO | 2011062727 | 11/2011 |
| WO | 2011159995 | 12/2011 |
| WO | 2012009822 | 1/2012 |
| WO | 2012015361 A1 | 2/2012 |
| WO | 2012018774 | 2/2012 |
| WO | 2012074781 | 6/2012 |
| WO | 2012165190 | 12/2012 |
| WO | 2012165191 A1 | 12/2012 |
| WO | 2013192487 | 12/2013 |
| WO | 2013192491 | 12/2013 |
| WO | 2014137620 | 9/2014 |
| WO | 2014173629 A1 | 10/2014 |
| WO | 2014200998 | 12/2014 |
| WO | 2015061429 | 4/2015 |
| WO | 2015061437 | 4/2015 |
| WO | 2017015466 A1 | 1/2017 |
| WO | 2017074891 | 5/2017 |

OTHER PUBLICATIONS

"String potentiometer". Wikipedia. Retrieved from <https://en.wikipedia.org/w/index.php?title=String_potentiometer&oldid=351725961>. Originally published Mar. 2010. (Year: 2010).*

"Dual in-line package". Wikipedia. Retrieved from <https://en.wikipedia.org/w/index.php?title=Dual_in-line_package&oldid=698675902>. Originally published Jan. 7, 2016. (Year: 2016).*

"Shelf Detector". Retrieved from <http://www.grottinilab.com/en/shelfdetector/> on May 20, 2019. (Year: 2019).*

DCI-Artform, Grocery.dcim.com/Products/SpaceGrid-I.aspx, "SpaceGrid I Trays—Enhance Frozen Food Appeal and Profitability", 2014, 3 pp.

DCI-Artform, Grocery.dcim.com/Products/SpaceGrid-II.aspx, "SpaceGrid II Trays—Maximize Profitability in Key Store Perimeter Categories", 2014, 2 pp.

Phoenix Displays LLC, Phoenixdisplays.com/displays.html, "Phoenix Displays LLC—Manufacturer of Forward-Facing Product Displays", 2014, 3 pp.

Trion Industries, Inc., Triononline.com/product/wonderfar-merchandising-system/, "Trion Wonderbar Merchandising System", 2017, 2 pp.

Fixtures Close Up, Pusher Paddle Message Rant, Jul. 28, 2010, 14 pp.

Patent Cooperation Treaty, International Searching Authority, Notification of Transmittal of the International Search Report and the Written Opinion of the International Searching Authority, or the Declaration issued in International Application No. PCT/US2017/057225, dated Apr. 12, 2018, 9 pp.

Intelectual Property Office, British Examination Report under Section 18(3) Corresponding to Application No. GB1414037.0, dated Apr. 13, 2017, 6 pp.

Intellectual Property Office, British Search Report under Section 17(5) for GB1414037.0, dated Dec. 1, 2014 (pp. 3).

International Search Report issued for PCT/US12/28250; dated Mar. 8, 2012, 3 pp.

International Search Report issued in International Application No. PCT/ US12/28250, dated Jul. 5, 2012, 1 p. (being resubmitted due to error in previously-cited date).

Patent Treaty Cooperation, International Search Report and Written Opinion for PCT/GB2015/052296 dated Feb. 16, 2016 (pp. 17).

Pos Tuning Udo Vobhenrich GMBH & Co. KG, POS-T Tuning LED Lighting of Trays, Sep. 9, 2010, 20 pp.

Streater, Streatlite Connector specifications page, Jun. 8, 2012, 1 p.

Trinity LLC, Trinity Credentials Presentation, Jul. 2013, 10 pp. (cover & title pp., 3, 13-18, 32).

Patent Cooperation Treaty, International Searching Authority, Notification of Transmittal of the International Search Report and the Written Opinion of the International Searching Authority, or the Declaration, May 25, 2017, 13 pp.

* cited by examiner

SENSORS, DEVICES, ADAPTERS AND MATING STRUCTURES FOR MERCHANDISERS AND RELATED METHODS

FIELD

This invention relates generally to product displays and, more particularly, to sensors, devices, adapters and auxiliary mating structures for merchandisers, such as merchandisers for front-facing product merchandise for displaying and dispensing product to consumers, and methods relating to same.

BACKGROUND

Product displays, such as merchandisers, are frequently used in retail environments to display products for sale. It is advantageous for these product displays to be configured to provide consumers easy access to the displayed product, to display the product cleanly and in an unobstructed manner so that product brands are readily visible and the store shelves look full or stocked at most times (also known as fronting), and to facilitate easy installation and restocking or reloading by store employees. To accomplish this, many different forms of displays have been developed that are front-facing or self-facing. For example, there are shelf management systems that mount directly on the shelf, bar mounted systems that replace shelves and suspend from a bar, grid-mounted systems that replace shelves and suspend from a grid system. In addition, there are often two versions of these systems: one gravity fed and the other utilizing a biased pusher or paddle to push the stocked product forward as items are removed from a shelf. Another benefit of these types of displays is that they are typically setup to keep the inventory as new and fresh as possible and to sell off all existing inventory before allowing newer or replacement product to be purchased (e.g., a concept often referred to as "first in first out"). Without these systems, retailers and/or product suppliers are forced to spend much more time and resources (and therefore money) on monitoring, organizing and fronting displayed product and typically end up doing so in a less efficient manner with less desirable results, such as having newer product stocked in front of older product increasing the likelihood of spoilage or product failing to be sold by the "sell by" date.

One problem with conventional merchandisers is that while they do not require to be manually faced, they do require employees to continuously check the product displays to determine if restocking is necessary. If they are not regularly checked they may run out of product, which results in lost sales.

While some conventional merchandisers have a physical flag attached to the merchandiser that will alert store associates when restocking is necessary, they still require the employees of the retailer to routinely inspect the merchandisers to see if the flags are shown. In addition, such systems typically require retailers to purchase an entire new line of product displays that have such technology integrated therein.

Conventional merchandisers, such as for example front-facing or self-facing merchandiser trays, also fail to provide flexibility that the purchasers of such merchandisers (e.g., retail stores, distribution centers, warehouses, etc.) may want so that they can customize the merchandisers for their specific needs or the needs of a particular display in the store (if not needed throughout the store).

Accordingly, it has been determined that a need exists for improved product display merchandisers that overcome the aforesaid problems and shortcomings.

BRIEF DESCRIPTION OF THE FIGURES

Embodiments of the invention are illustrated in the figures of the accompanying drawings in which.

Figure 1A:
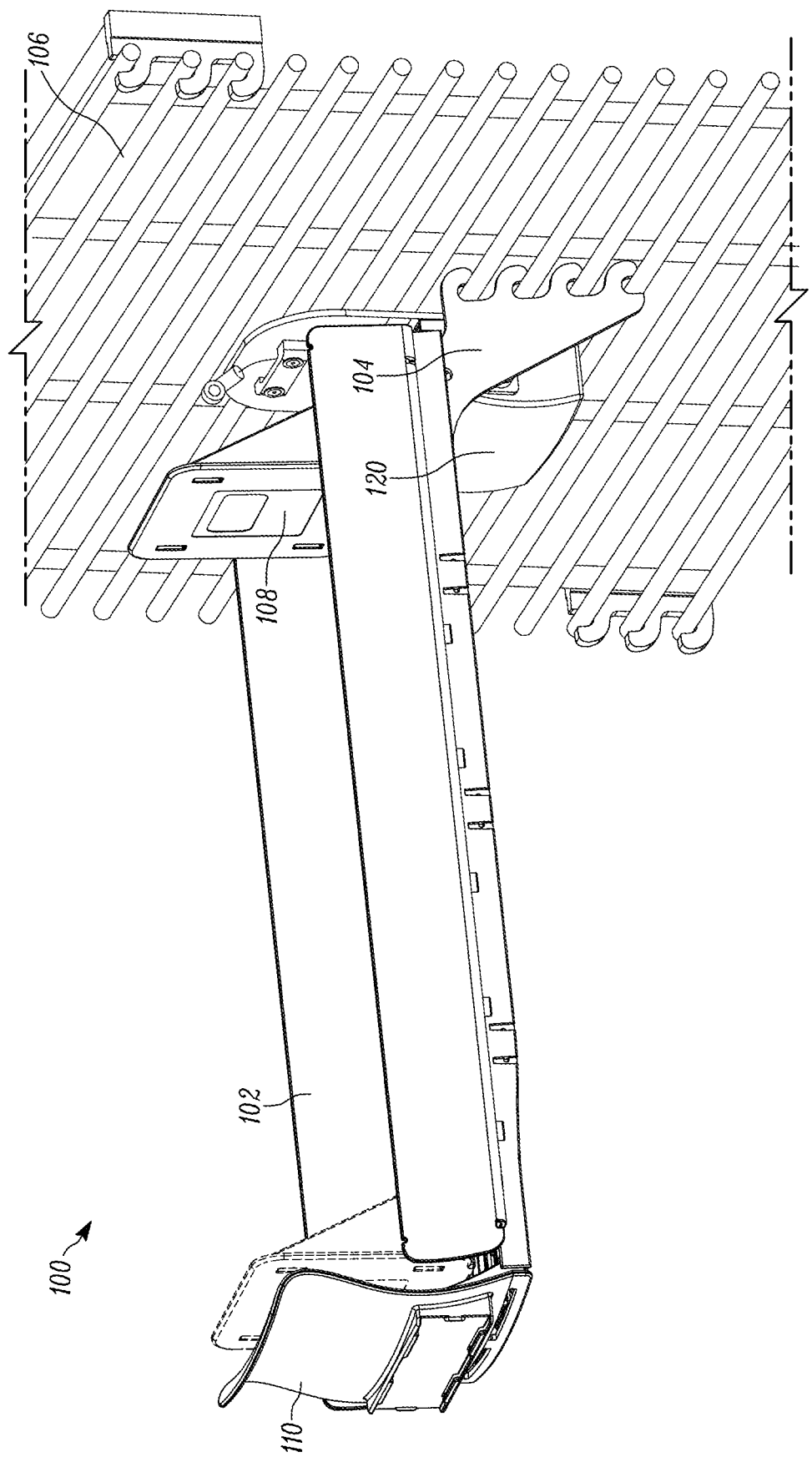
FIG. 1A is a perspective view of a smart product display merchandiser according to some embodiments of the present invention illustrating a non-integrated product sensor that can be retrofit for use with existing product displays or merchandisers.
Figure 1B:
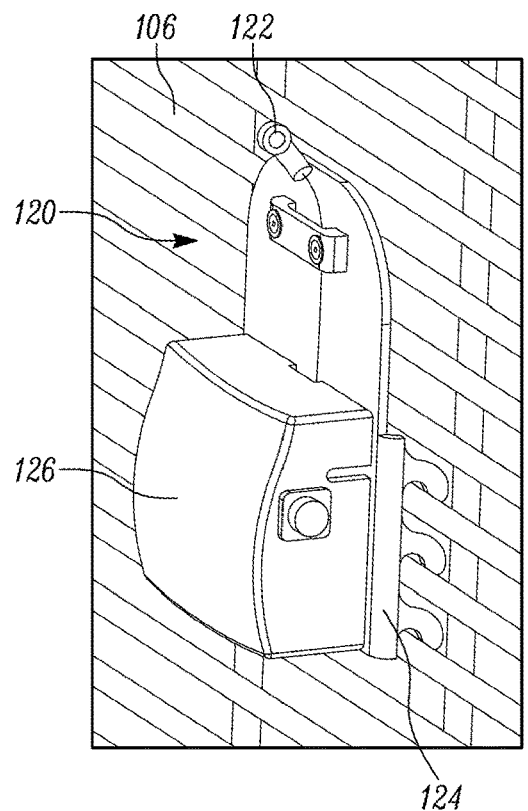
FIG. 1B is a perspective view of the product sensor of FIG. 1A illustrating the sensor mounted on a grid system.
Figure 1C:
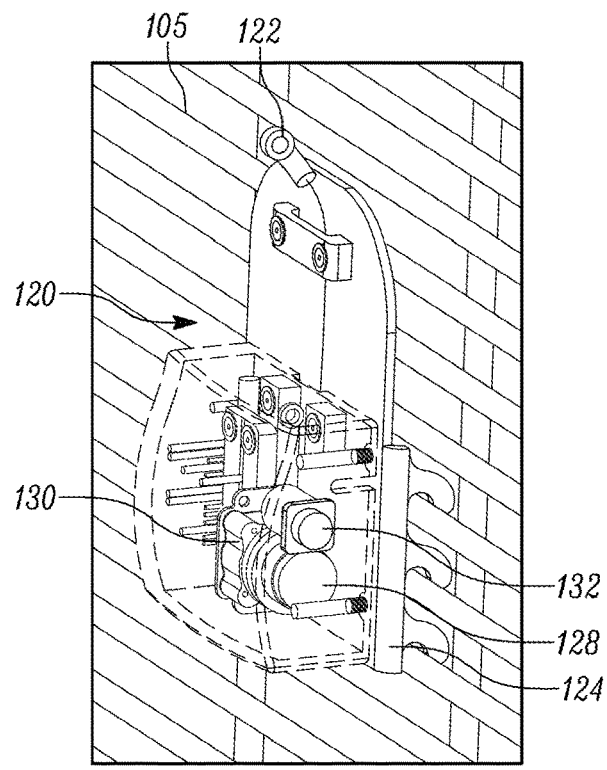
FIG. 1C is a similar perspective view of the product sensor of FIG. 1B, but illustrating the product sensor housing or cover in a more transparent form to make the inner components of same visible.

Elements in the figures are illustrated for simplicity and clarity and have not necessarily been drawn to scale or to include all features, options or attachments. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DESCRIPTION OF THE EMBODIMENTS

Introduction

Many variations of product displays are discussed herein and even further are contemplated in view of this disclosure. The product displays discussed herein are configured, and designed, to hold and display product that is for sale and to front face this product so that the next item in the display is moved to the front of the display as the product in front of it is removed from the merchandiser. The product displays include a product sensor for indicating data related to the product stocked in the product display. The data may be any of a number of things, such as a low product inventory condition, a real-time status of the product display or product in the product display (e.g., such as full, ¾ full, ½ full, ¼ full, 15 products left, 10 products left, 5 products left, 1 product left, etc.), a product display condition such as product has not been removed for a period of time and should be checked to determine if there is a problem, etc.

In the form illustrated in FIGS. 1A-1F, the product sensor is a distance sensor which monitors the position of a pusher and transmits to the product display user (e.g., retailer, store owner, product supplier, etc.) an alert when the pusher nears the front of the tray indicating the need to restock the display. It should be appreciated that this disclosure is intended to cover the product sensor alone as well as the product sensor incorporated in a variety of different product displays or product display merchandisers. While many variations of product sensors and product displays are described and contemplated herein, FIGS. 1A-1F, and the associated text, generally depict and describe a first embodiment of a product display, wherein the distance sensor is configured to be retrofitted onto an existing product display. FIGS. 2A-2B and its associated text generally depict a second embodiment, FIG. 3 and its associated text generally depict a third embodiment, and FIG. 4, and the associated text, generally depict and describe a fourth embodiment of a product display merchandiser, FIG. 5 and its associated text generally depict a fifth embodiment, FIG. 6 and its associated text generally depict a sixth embodiment, FIG. 7 and its associated text depict a seventh embodiment, and FIG. 8 and its associated text generally depict a product tracking system comprising a plurality of the merchandisers disclosed in the other embodiments.

FIGS. 1A-1F illustrate an exemplary embodiment of a product display merchandiser 100, according to some forms of the inventive subject matter. The product display merchandiser 100 includes a tray 102 for holding a product to be displayed. The product display merchandiser 100 includes an attachment member 104 for mounting the product display merchandiser 100 to a grid 106. Such grids are often connected to the vertical risers or supports of a convention gondola shelving system. As referenced above and will be discussed in other embodiments below, in alternative embodiments, the attachment member 104 is configured to attach the product display merchandiser 100 in other ways, including mounting on a bar, mounting on a shelf, fitting into one or more horizontal tracks, or others. The tray 102 includes a track 103 along which a pusher 108 travels to push products towards the retaining wall 110. The pusher 108 is biased by a biasing mechanism, such as a spring (not shown). In some embodiments a dampener counters the biasing force imposed by the biasing mechanism.

In this first embodiment, the product display is a self-contained off-shelf merchandiser that has a base with adjustable width side members (e.g., wires, springs, etc.) and suspends from a vertical support (e.g., bar, grid, gondola upright, etc.) without the need for additional shelving. However, in alternate forms, these may be provided in forms meant for resting on shelves, such as conventional gondola shelving found in most retailers or stores. Examples of such systems are disclosed in U.S. Pat. No. 7,681,745 (issued Mar. 23, 2010), U.S. Pat. No. 7,681,744 (issued Mar. 23, 2010), U.S. Pat. No. 7,195,123 (issued Mar. 27, 2007), U.S. Pat. No. 7,168,579 (issued Jan. 30, 2007), U.S. Pat. No. 5,855,283 (issued Jan. 5, 1999), U.S. Pat. No. 5,855,281 (issued Jan. 5, 1999), U.S. Patent Application Publication Nos. 20100107670 (published May 6, 2010), 20050199565 (published Sep. 15, 2005), 20050199564 (published Sep. 15, 2005), 20050199563 (published Sep. 15, 2005), 20050072747 (published Apr. 7, 2005), 20030217980 (published Nov. 27, 2003), 20030200688 (published Oct. 30, 2005) and 20030057167 (published Mar. 27, 2003), 20030056697 (published Mar. 27, 2003), U.S. Provisional Patent Application Nos. 62/195,847 (filed Jul. 23, 2015) and 62/247,744 (filed Oct. 28, 2015) and British Publication No. GB2360514 (published Sep. 26, 2001) all of which are incorporated herein in their entirety.

In the form illustrated in FIGS. 1A-1F, the product display merchandiser 100 includes a distance sensor 120 as the product sensor. In a preferred form, the distance sensor 120 is a string potentiometer. The distance sensor 120 includes a retractable member 122, a mounting means 124, and a case 126. The mounting means 124 can be one or more hooked blades for attaching to a grid (as shown), bolts, screws, one or more clips, or a body configured to slide over or into a portion of the product display merchandiser 100 or shelf unit. Inside the case 126 there is a spool 128 for retracting the retractable member 122, a sensor 130 for detecting how much of the retractable member 122 is out, and a transmitter 132 for communicating with a remote device, such as an external computing device. The transmitter 132 serves as an indicator, in that it indicates the location of the pusher 108 to the user via the external computing device. In a preferred form, the communication will be a text or other indicia sufficient to indicate to the store associate or user which product display or merchandiser requires restocking or has a problem. In alternative embodiments, the communication will be more simplistic such as simply illuminating a light or displaying an icon or graphic that indicates to a store associate that a merchandiser in their responsible area is in need of restocking or has a problem associated with same. For example, in some forms the transmitter 132 is replaced or combined with a second kind of indicator such as a light, a display, a flag, or a buzzer. The sensor 130 can be a transducer, a rotation sensor, or any other sensor capable of detecting how much of the retractable member 122 is out of spool 128.

The transmitter 132 can be a wireless or wired transmitter in communication with an external computing device. In a first embodiment, the transmitter 132 outputs the real time location of the pusher 108 either continuously or intermittently. In a second embodiment, the transmitter 132 only outputs the location of the pusher once it has reached a certain location along the track 103. This location can be preset by the manufacturer at a certain percentage of the total travel distance, or it can be set by the end user based on the product displayed. The external computing device is either a central computer monitoring products for an entire store or portable computing devices carried by employees in the department in which the product display merchandiser is located.

Figure 1D:
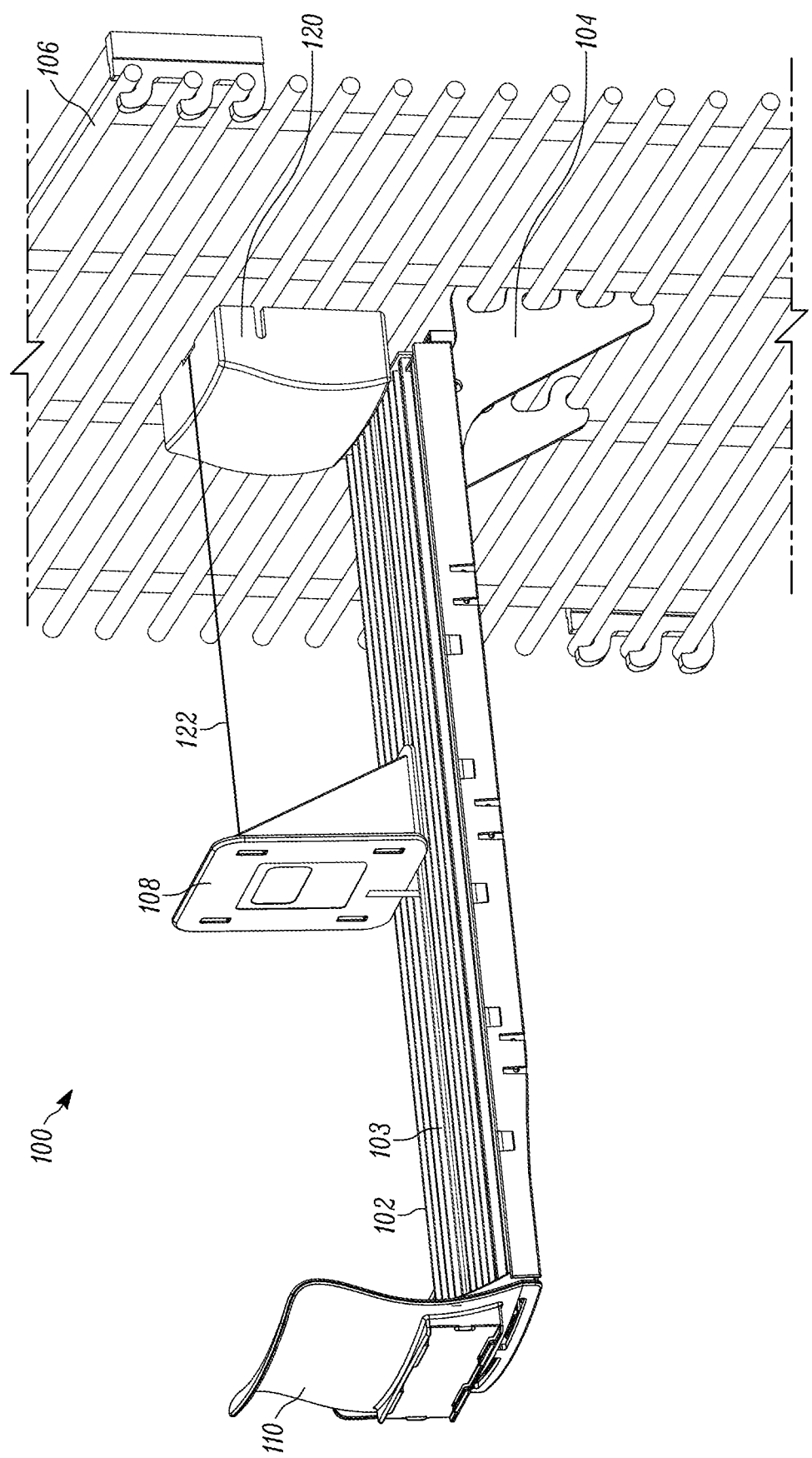
FIGS. 1D and 1E are perspective views of alternative configurations of the merchandiser of FIG. 1A illustrating the merchandiser without side wings and the product sensor mounted in different configurations in accordance with other embodiments disclosed herein.
Figure 1E:
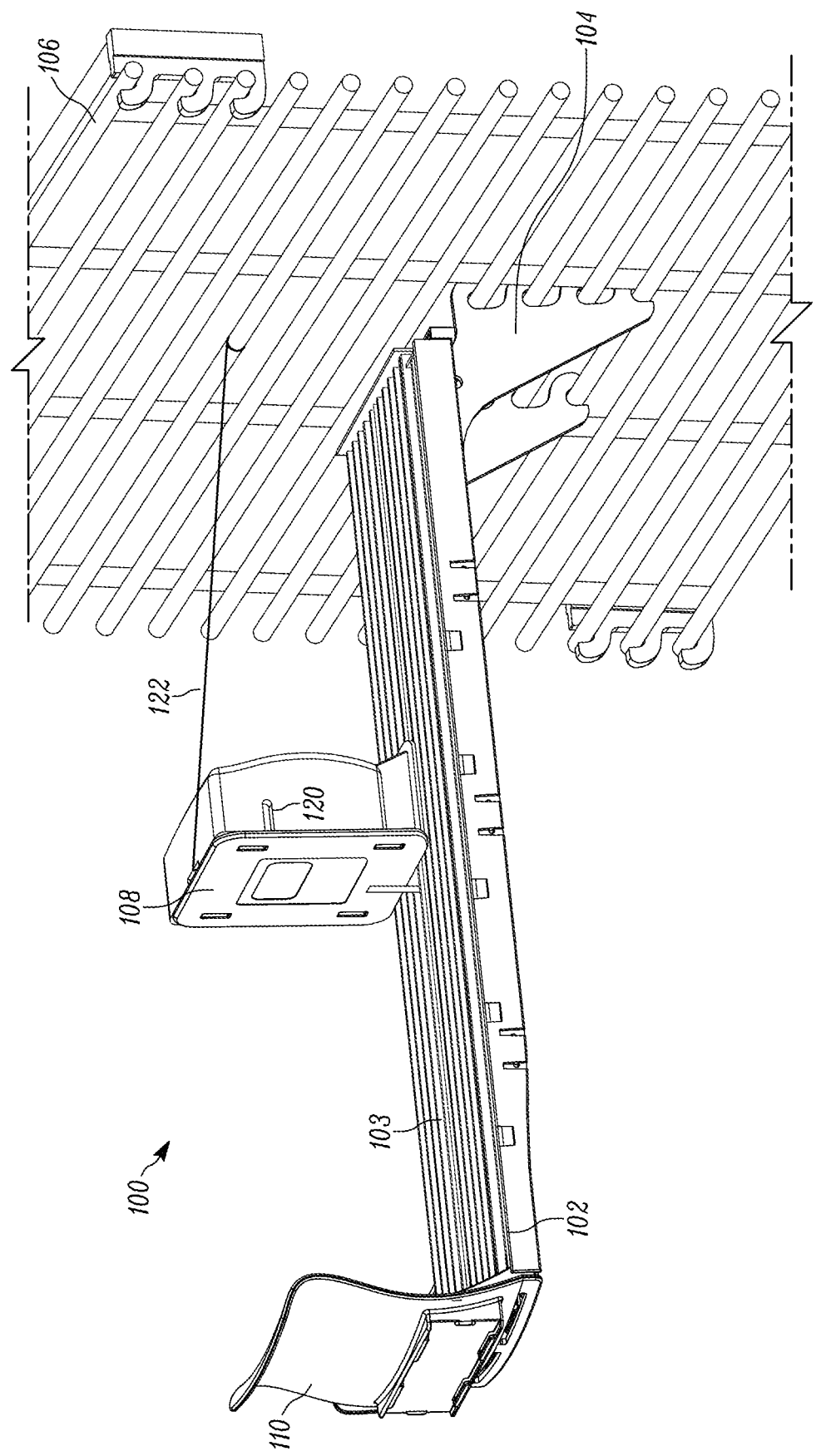
Figure 1F:
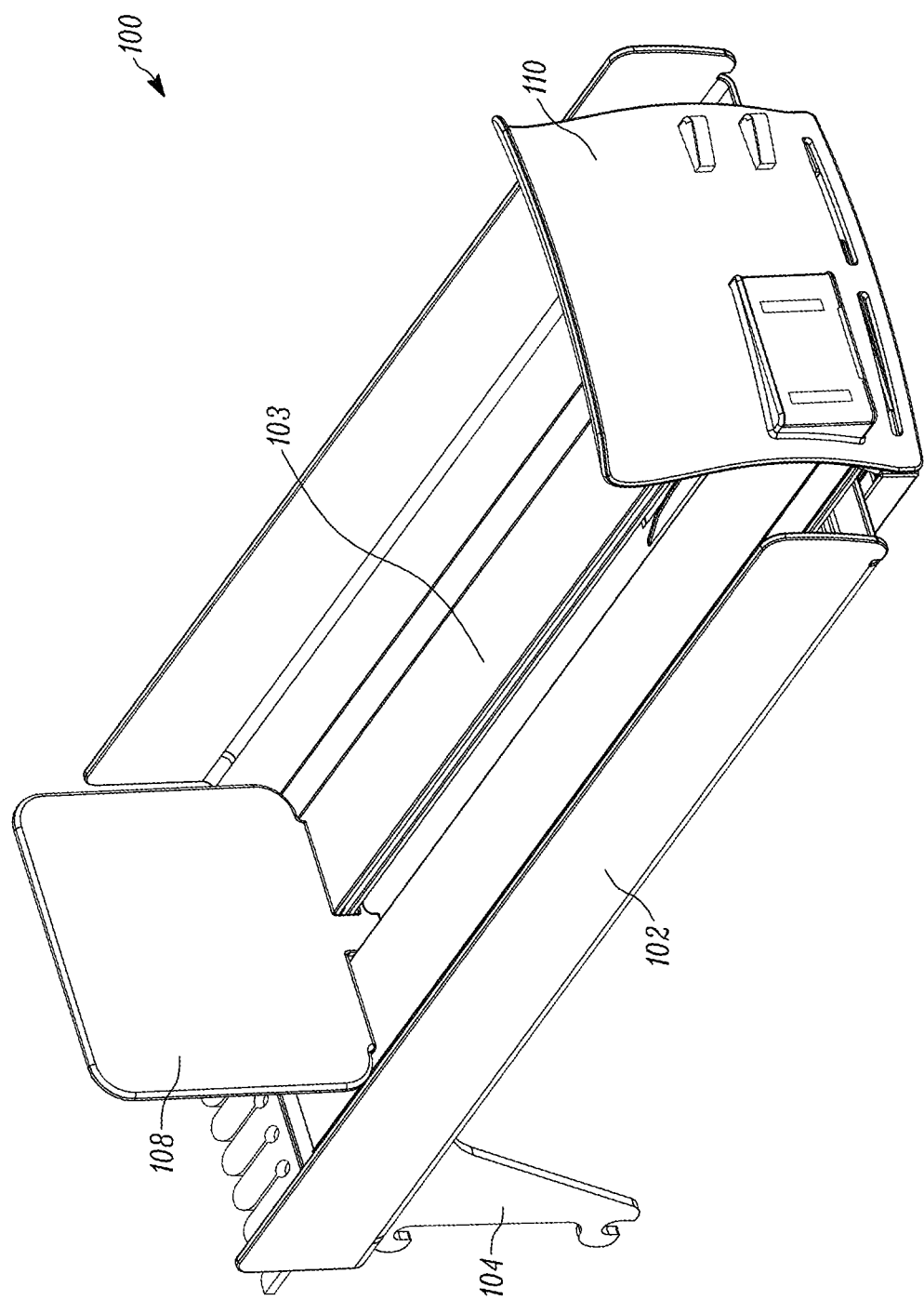
FIG. 1F shows another perspective view of the product display merchandiser shown in FIG. 1A taken from above.
Figure 2A:
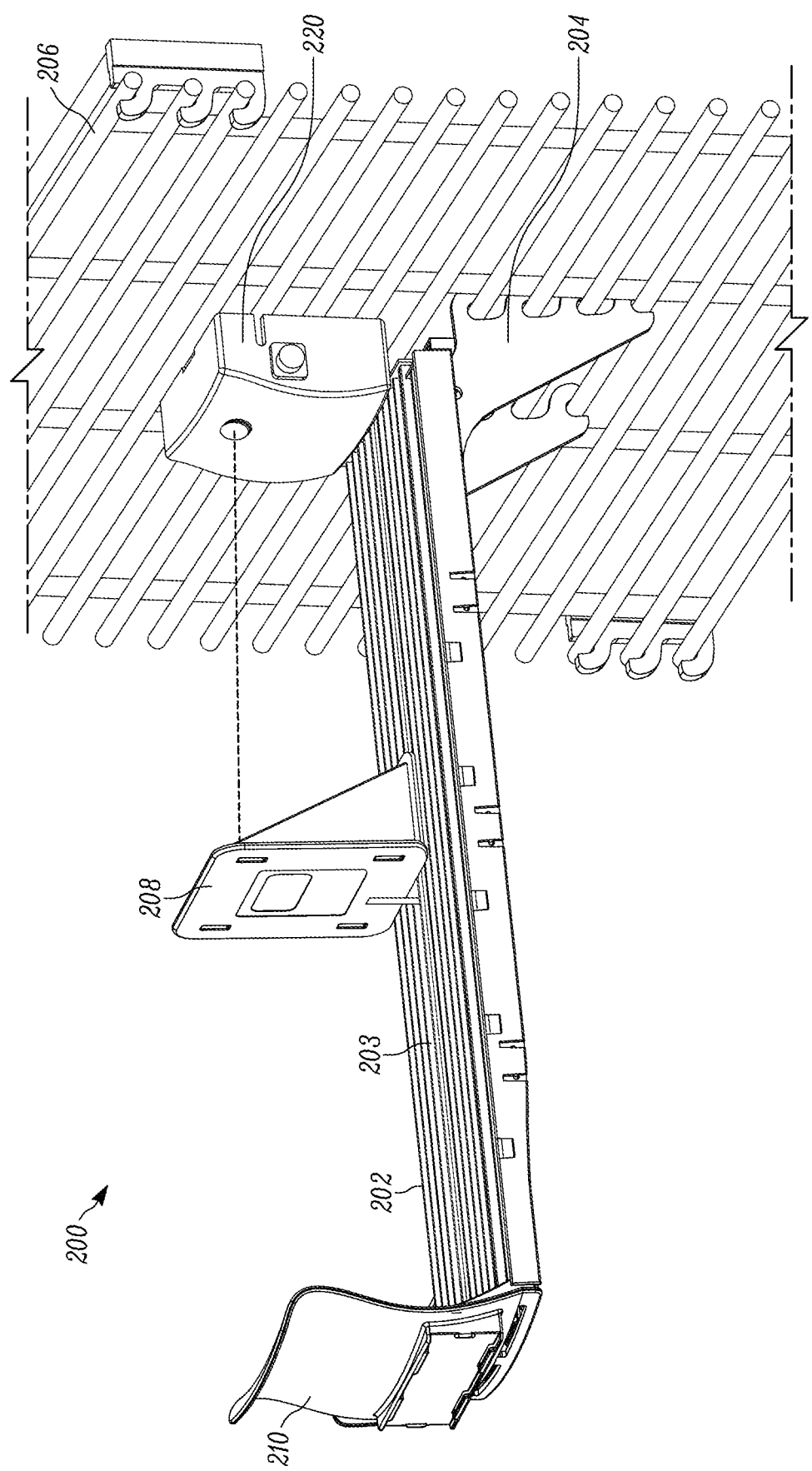
FIGS. 2A-2B are perspective views of alternate product display merchandisers in accordance with different embodiments of the invention, illustrating another exemplary product sensor in different configurations on or with respect to the product display.
Figure 2B:
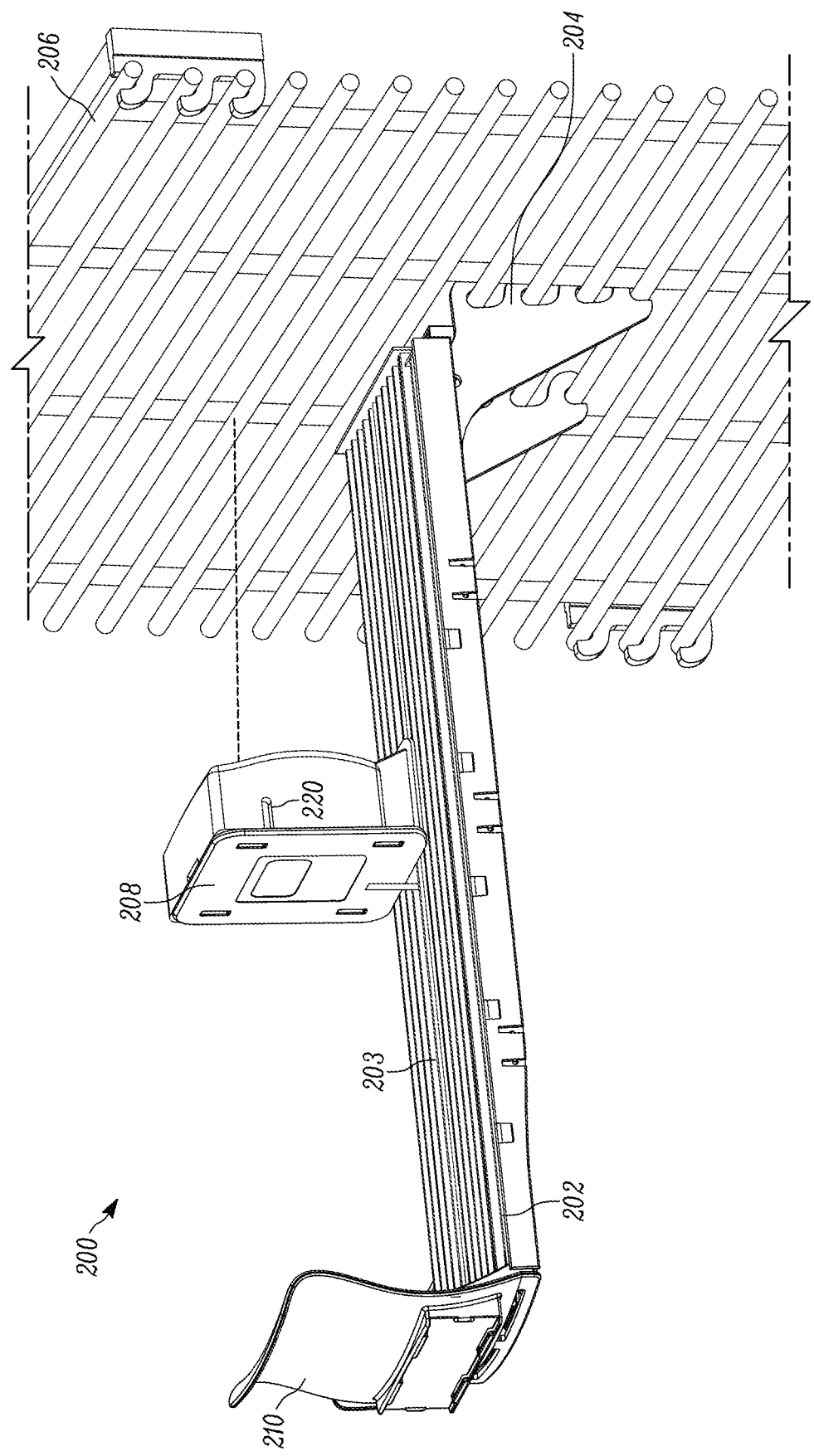

FIGS. 1A and 1F shows a first configuration in which the distance sensor 120 is mounted below the tray 102. The retractable member 122 runs through a hole in the base of the tray 102 and attaches to the back of the pusher 108. As the pusher 108 moves along the track 103 towards the retaining wall 110, more retractable member 122 is unwound from the spool 128 which is detected by the sensor 130.

FIG. 1D shows an alternative configuration in which the distance sensor 120 is mounted above the tray 102. As in FIG. 1A, the retractable member 122 is attached to the pusher 108.

FIG. 1E shows a third configuration in which the distance sensor 120 is mounted to the pusher 108. The retractable member 122 is attached to a fixed point on either the grid 106 or on the product display merchandiser 100 such that as the pusher 108 moves along the track 103 towards the retaining wall 110, more retractable member 122 is unwound from the spool 128 which is detected by the sensor 130. The distance sensor 120 can be either integrated into the pusher 108, or configured to removably attach to the pusher 108. The removably attachable distance sensor 120 can be added to the pusher 108 on product display merchandisers originally sold without a sensing means.

In an alternative embodiment, the biasing mechanism and the distance sensor 120 are combined. In this embodiment, the biasing mechanism comprises a wound up metal strip in one of the track 103 and the pusher 108. One end of the metal strip is attached to the other of the track 103 and the pusher 108 such that it unwinds when the pusher 108 moves along the track 103. The spring constant of the metal strip biases the pusher 108 relative to the track 103 so as to rewind the metal strip. This metal strip would double at the retractable member 122 of the distance sensor 120 so that a sensor 130 detects the winding or unwinding of the metal strip.

In below listed embodiments, similar components share the same final two digits as their equivalent in previous embodiments with the first digit indicating the embodiment number. For example, on the product display merchandiser 100 the pusher is numbered 108, whereas on the product display merchandiser 200 the pusher is numbered 208.

FIGS. 2A-2B show product display merchandisers 200 with alternative distance sensors 220. The distance sensors 220 detect the location of the pusher 208 relative to the tray 202 without the use of a retractable member 222. The distance sensor 220 can be one of an infrared sensor, a laser with light sensor, an ultrasonic sensor, or a Hall Effect proximity sensor.

As shown in FIG. 2A, the distance sensor 220 can be mounted on a fixed point on the product display merchandiser 200 or on the shelf or structure supporting the product display merchandiser 200 and configured to detect the distance between the distance sensor 220 and the pusher 208. Alternatively, the distance sensor 220 can be attached to the pusher 108 and configured to detect the distance between the distance sensor 220 and a fixed point on the product display merchandiser 200 or on the shelf or structure supporting the product display merchandiser 200 as shown in FIG. 2B.

Figure 3:
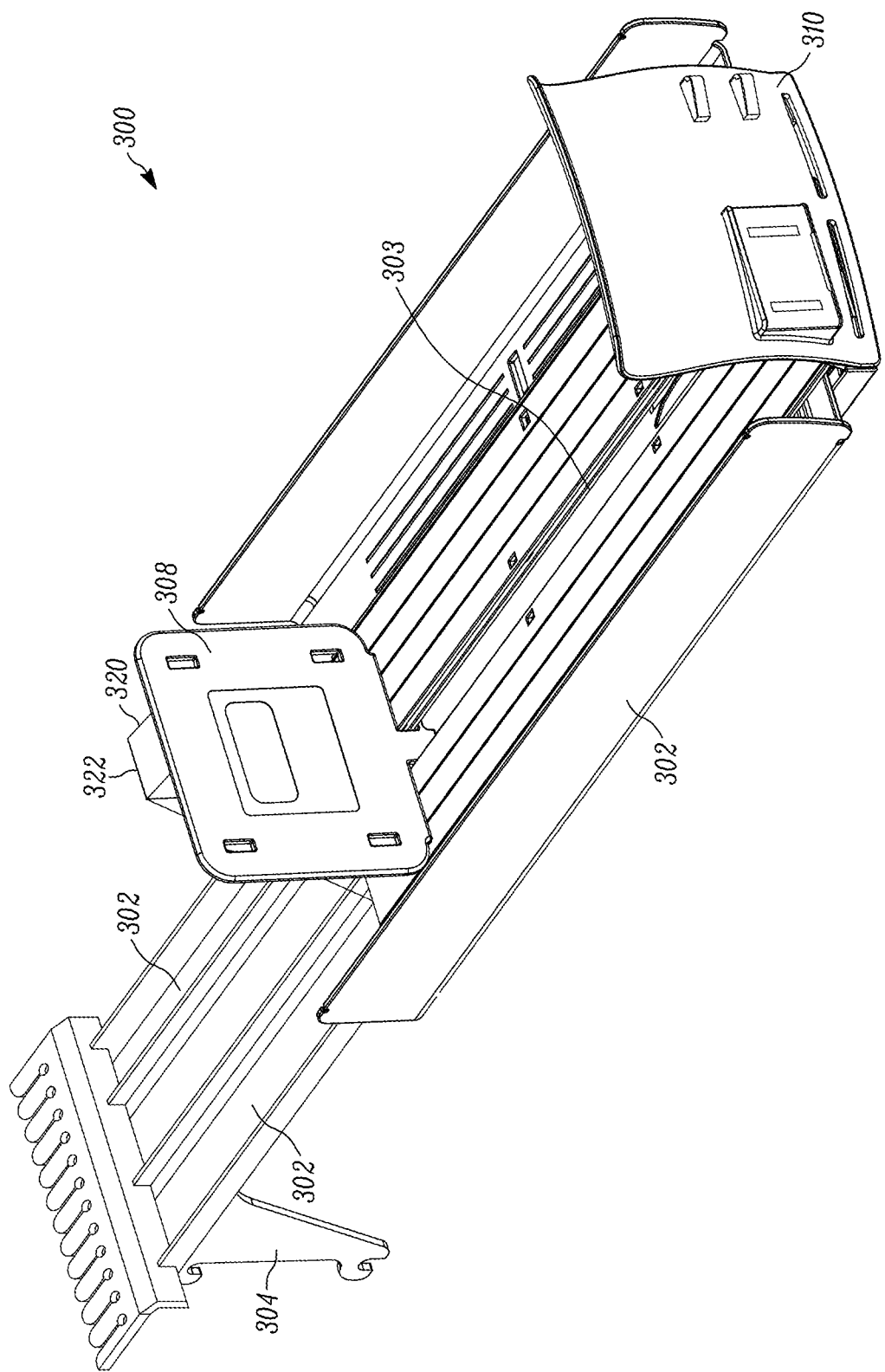
FIG. 3 is a perspective view of yet another alternate embodiment of the present invention in which a product sensor is utilized on a movable tray or drawer type merchandiser with the tray of the product display merchandiser being movably mounted to a base such that the tray is slidable between a first, retracted position for normal display of product and operation of the merchandiser and a second, extended position where the tray is extended out for easy restocking of the merchandiser.

FIG. 3 shows an alternative embodiment in which the tray 302 of the product display merchandiser 300 is mounted on a pair of arms 302 such that the tray 302 is slidable between a first and second position. In this embodiment, the tray 302 slides out to be more easily accessed when being restocked. In the preferred configuration for this embodiment, the distance sensor 320 detects the distance between the pusher 308 and a fixed point on the tray 302. The distance sensor 320 can be any of the distance sensors disclosed herein. This way the distance detected accurately reflects the number of products between the pusher 308 and retaining wall 310 regardless of the location of the tray 302 along the arms 302.

In an alternative configuration, the distance sensor 320 detects the distance between the pusher 308 and a fixed point on the arms 302, attachment means 304, or shelf or other supporting structure. In this configuration, the quantity of product represented by the distance detected will vary based on the location of the tray 302 along the arms 302. This discrepancy can be accounted for by a second sensor detecting the location of the tray 302. Alternatively, the system can work without adjusting for the location of the tray 302, as the tray 302 remains in the first position at all times unless it is being stocked.

Figure 4:
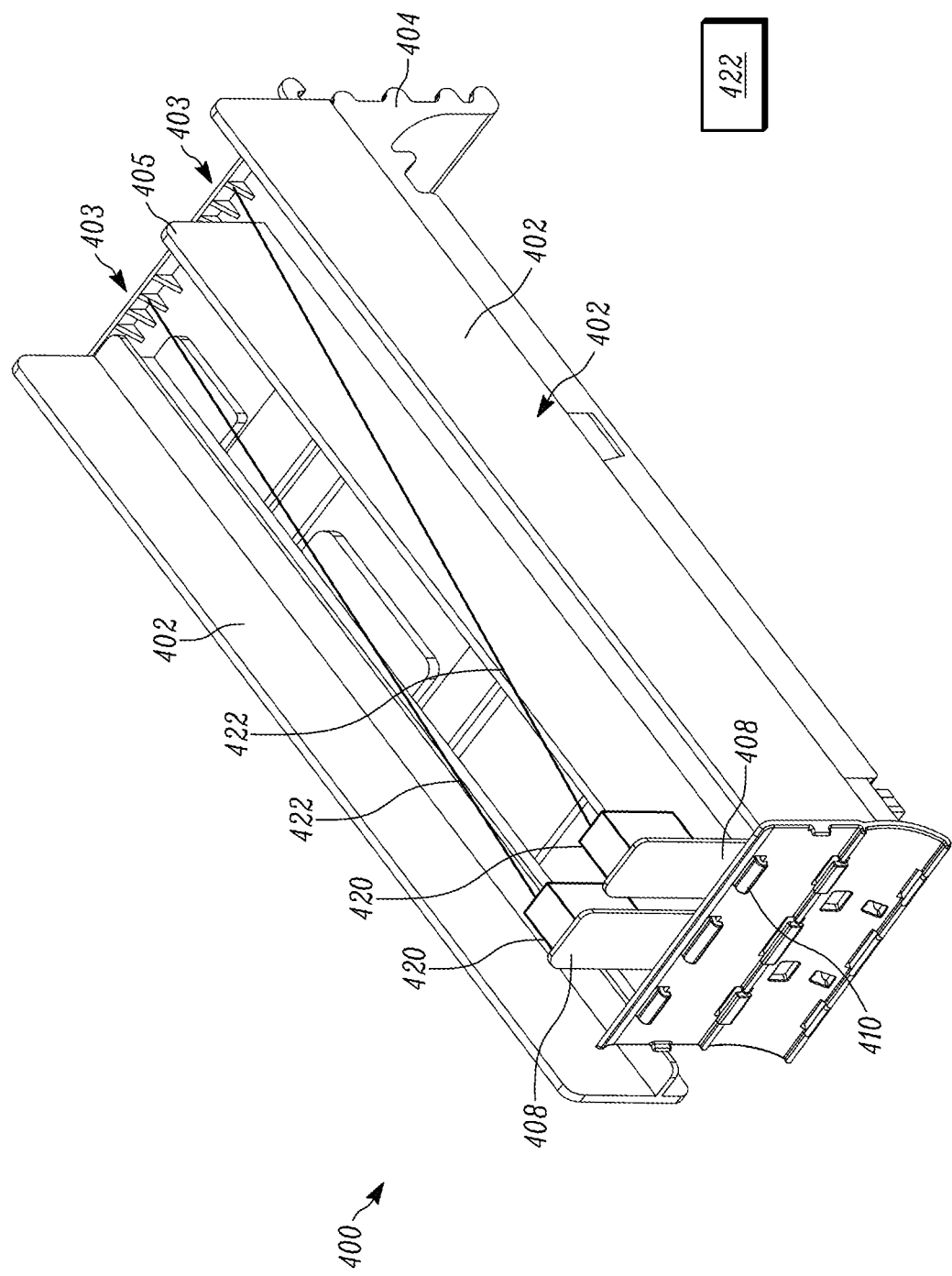
FIG. 4 is a perspective view of another embodiment of the invention illustrating a product display merchandiser having a plurality of pushers and adjustable width capabilities to accommodate products of different sizes.

FIG. 4 illustrates an embodiment of the present invention in which the product display merchandiser 400 has a plurality of pushers 408. The tray 402 is comprised of a retaining wall 410 two adjustable sidewalls 402 and a center wall 404. Each adjustable sidewall 402 encloses a channel 403 between it, the center wall 404, and the retaining wall 410. The two pushers 408 are slidably mounted on tracks 403 that are spaced out a set distance from the center wall 404. Biasing mechanisms apply a force on the pushers 408 urging them along the tracks 403 towards the retaining wall 410 The adjustable sidewalls 402 can be adjusted relative to the center wall 404 in order to accommodate different size products. As shown, each pusher 108 has a corresponding distance sensor 420. The distance sensors 420 can be any type of distance sensor disclosed herein. This way the number of products in each channel 403 are tracked individually. As in previous embodiments, the distance sensors 420 detect the distance between the pushers 408 and a fixed point on the product display merchandiser 400. This distance represents a quantity of products located between the pushers 408 and the retaining wall 410.

In an alternative configuration, the plurality of distance sensors 420 are in communication with a local computing device 422. The local computing device 422 monitors the distances output by each distance sensor 420 and transmits the combined total number of products in each channel 403. In this configuration, the product display merchandiser 400 comprises a plurality of channels 403 filled with the same product. The product display merchandiser 400 only signals the need to be restocked when the amount of product spread between all of the channels 403 is low. In an alternative version of this configuration the local computing device 422 monitors the distances detected by a plurality of product display merchandisers 100, 200, 300, or 400.

In a third configuration, the plurality of pushers 408 are attached to a plurality of retractable members 422 of the same string potentiometer 420. Each retractable member 422 has a corresponding spool 428 and sensor 430. The transmitter 432 outputs the combined number of products in each channel 403 as represented by the combined readings of each sensors 430.

Figure 5:
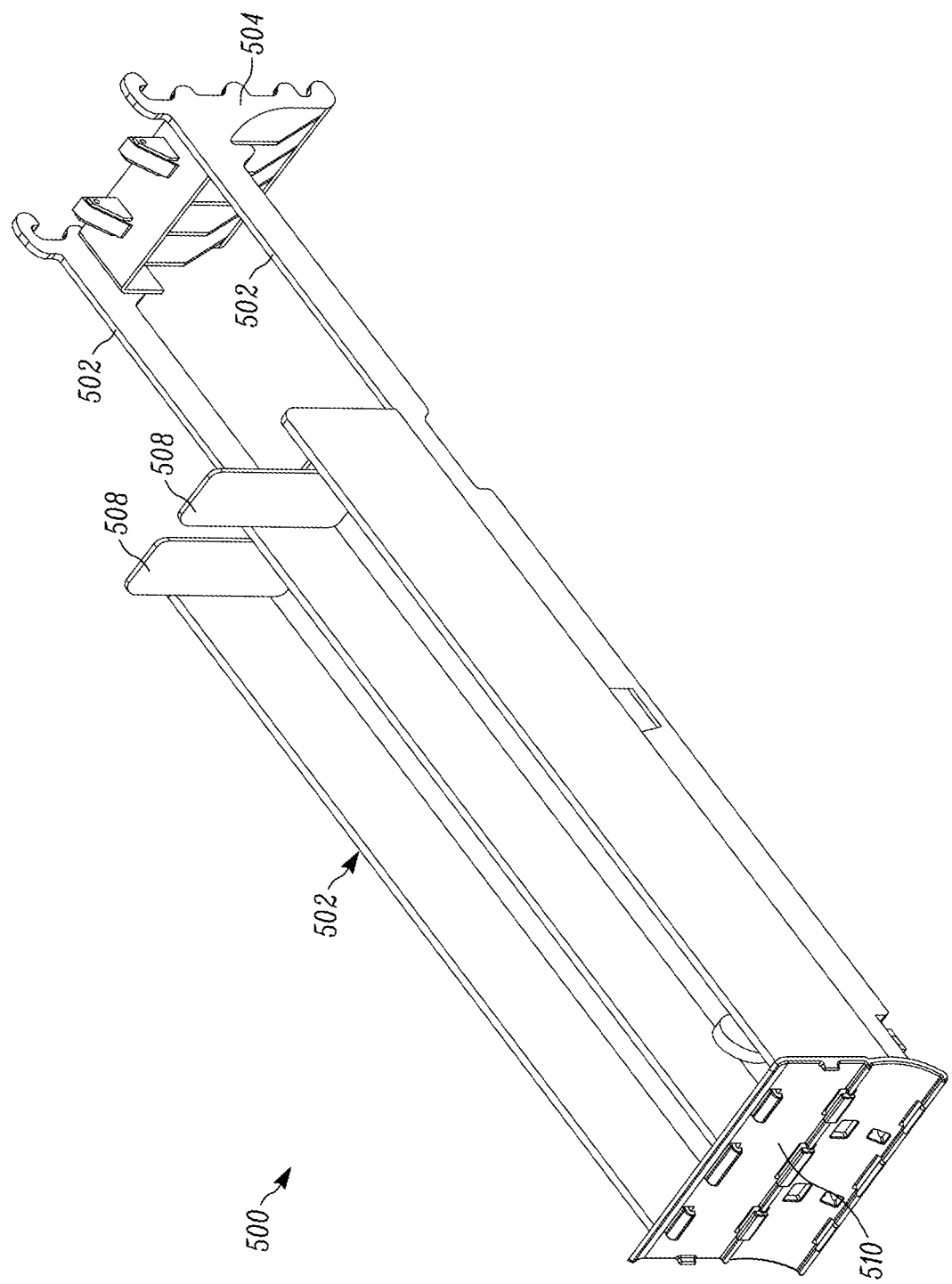
FIG. 5 is a perspective view of a similar product display merchandiser to FIG. 4, however, this merchandiser is of the drawer or tray type in which the tray can be moved between a first or retracted position and second or extended position for restocking purposes and in this form the tray extends directly from a support arm or arms rather than from an additional base structure.

FIG. 5 shows an embodiment of the product display merchandiser 500 which is a modification to the product display merchandiser 400 in which the tray 502 is mounted on a pair of arms 502 such that the tray 502 is slidable between a first and second position. The distance sensors 520 are mounted on one of the tray 502, the pushers 508, or a fixed point on the arms 502 or other fixed point. The distance sensors 520 measure the distance between the pushers 508 and either a fixed point on the tray 502 or a fixed point on the arms 502, attachment means 504, or shelf or support structure. This measurement is transmitted to an external computing device in order to alert users when the product display merchandiser 500 needs restocked as in the above embodiments.

Figure 6:
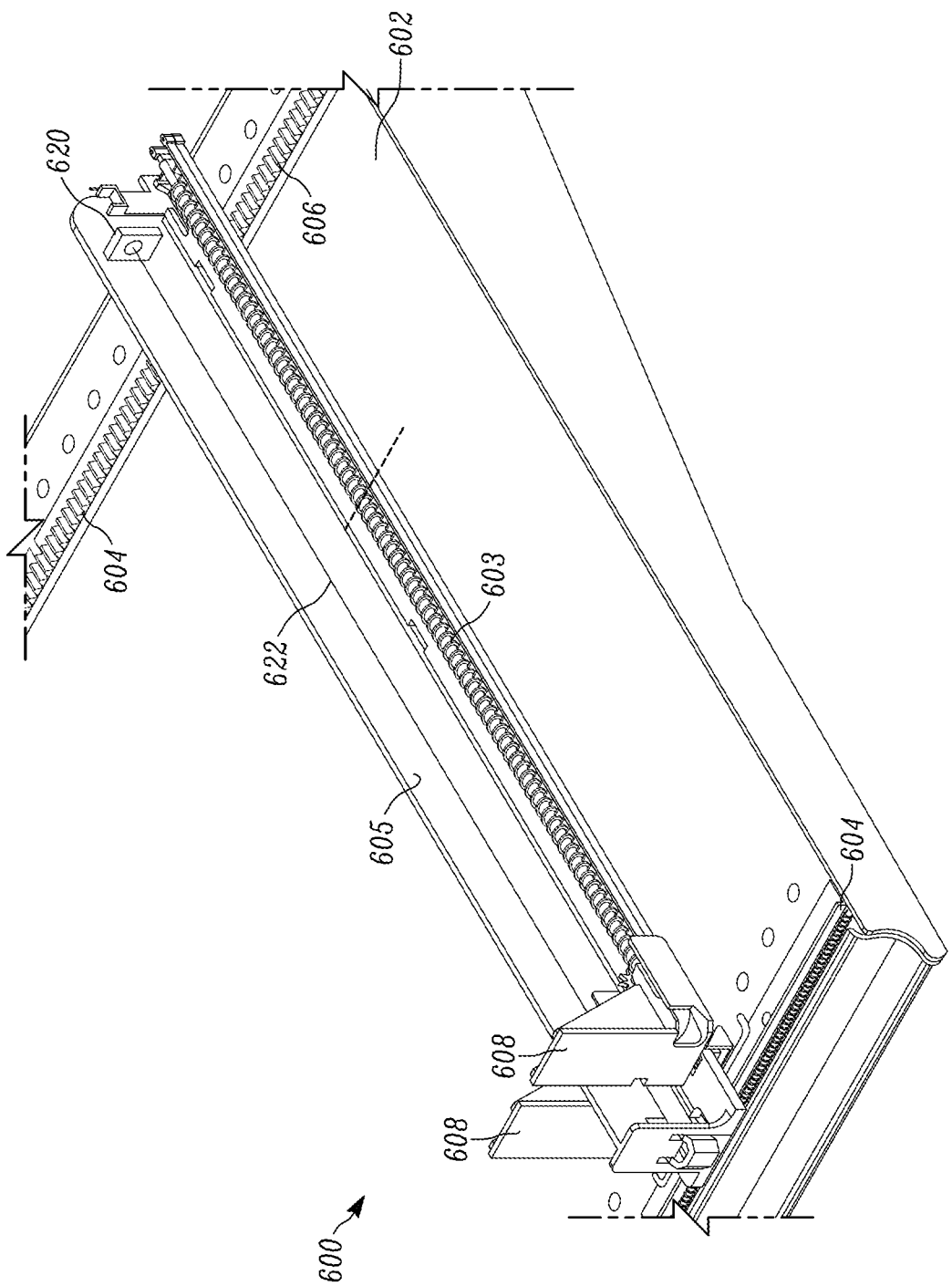
FIG. 6 is a perspective view of an alternative embodiment of the present invention in which a product sensor is incorporated with a shelf-mounted product display merchandiser or shelf management system illustrating the invention mounted on a shelf instead of suspended from a grid.

FIG. 6 shows an alternative embodiment in which an on-shelf merchandiser or shelf management system is illustrated connected or coupled to a shelf, such as a conventional gondola shelf found in most retailers or stores. Examples of such systems are disclosed in U.S. Pat. No. 7,124,898 (issued Oct. 24, 2006), U.S. Pat. No. 7,028,852 (issued Apr. 18, 2006), U.S. Pat. No. 6,886,699 (issued May 3, 2005), U.S. Pat. No. 6,409,028 (issued Jun. 25, 2002), U.S. Pat. No. 6,227,385 (issued May 8, 2001), U.S. Pat. No. 5,855,283 (issued Jan. 5, 1999), U.S. Patent Application Publication Nos. 20080156752 (published Jul. 3, 2008), 20070272634 (published Nov. 29, 2007), 20050189310 (published Sep. 1, 2005) and British Publication No. GB2291788 (published Feb. 7, 1996), all of which are incorporated herein in their entirety.

In the form illustrated, a product display merchandiser 600 is mounted on a shelf 602. On the shelf 602 are at one or more horizontal tracks 604 running in the longitudinal direction of the shelf 602, perpendicular to the track 603 along with the pusher 608 moves. Protrusions on the product display merchandiser 600 interact with the horizontal tracks 604 in order to hold the merchandiser 600 in position. In some embodiments the merchandiser 600 is slidably attached to the horizontal tracks 604 such that it can be moved along the shelf 602 in the longitudinal direction. In this embodiment a locking means 606 releasably locks the merchandiser 600 in spot in the horizontal tracks 604. In the shown embodiment, the locking means 606 comprises a comb which interacts with the protrusion or recess on the merchandiser 600. Alternatively the locking means 606 could be a set screw, a cam, a magnet, a sliding lock, a wedge, or any other device capable of limiting motion of the merchandiser 600 along the horizontal tracks 604.

The product display merchandiser 600 as shown includes a divider wall 605 sticking up from the shelf 602 and running parallel to the track 603. In alternative embodiments, the divider wall 605 is independent of the track 603 and pusher 608 assembly. A distance sensor 620 is configured to measure the distance between the pusher 608 and a fixed point on the divider wall 605, track 603, or shelf 602. As in previous embodiments, the distance sensor 620 can be mounted on the pusher 608 (as shown), the divider wall 605, the track 603, or the shelf 602. The distance sensor 620 can be any of the types of distance sensors disclosed herein. As in other embodiments, the distance sensor 620 communicates with an external computing device.

Figure 7:
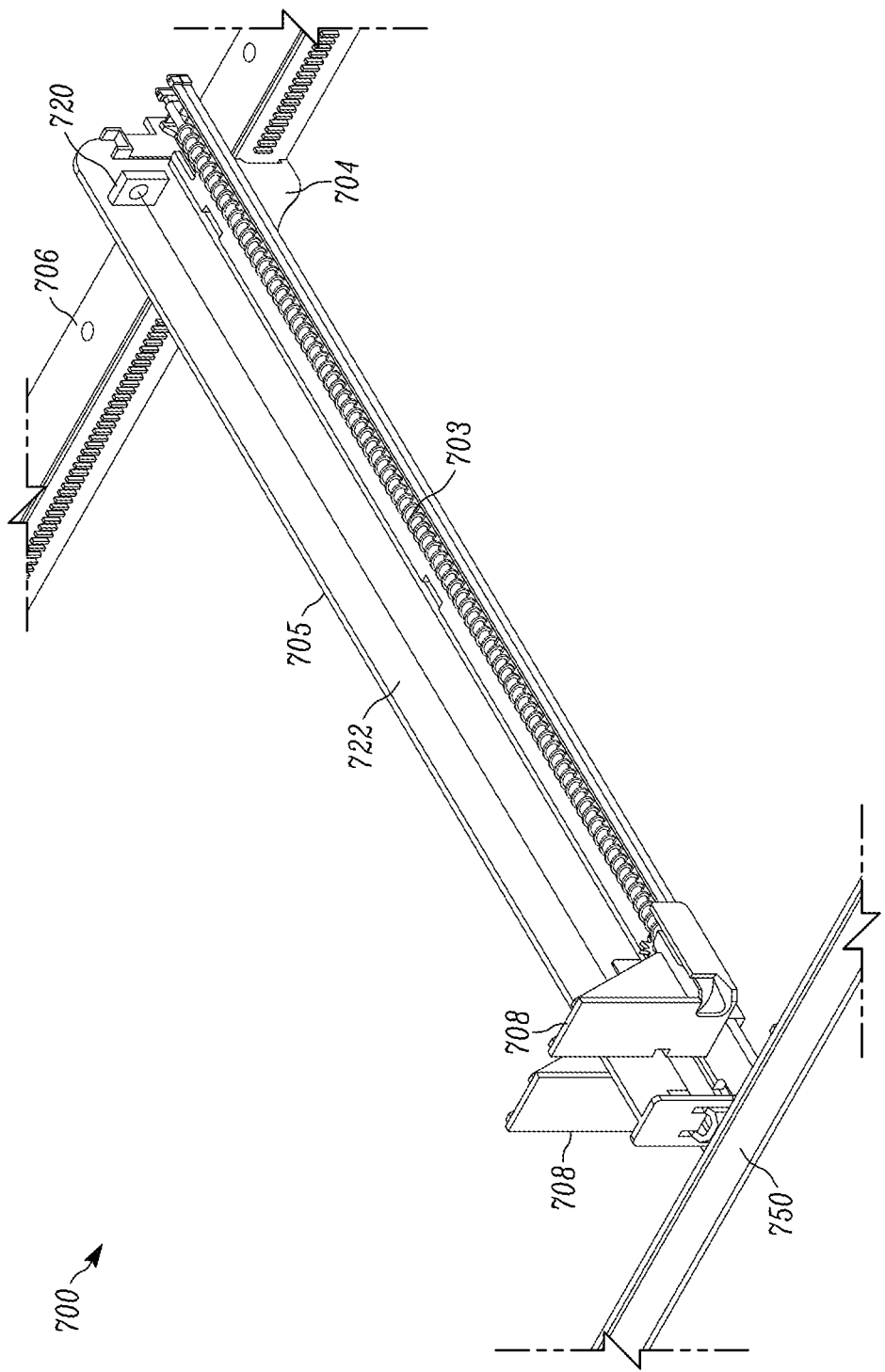
FIG. 7 is a perspective view of an alternate embodiment of the present invention illustrating a product sensor incorporated with a bar mounted product display.

FIG. 7 illustrates yet another embodiment in accordance with some aspects of the invention disclosed herein. This product display is similar to that depicted in FIG. 6, however, instead of being an on-shelf merchandiser or shelf management system, this version is another type of off-shelf system that is suspended from a support structure such as a bar, grid, gondola upright slot, etc. This type of merchandiser can extend out from the support structure in a generally horizontal manner (e.g., such as at a perpendicular angle to the support structure), or it can extend out from the support structure in an angled manner (e.g., such as at an acute angle with respect to the support structure). In some forms, systems such as this may be angled downward with respect to the support structure to be gravity fed and may be used with or without the pusher assembly. In some gravity fed configurations, the product may move forward with gravity alone or may include a weighted object placed at the rear of the last product to help assist in moving the product forward as items from the front are removed by consumers. In either case (i.e., with or without the weighted object), the product display may be configured with one or more of the product sensors disclosed herein such as the IR product sensor discussed above with respect to FIGS. 2A-B.

FIG. 7 shows an alternative embodiment in which a product display merchandiser 700 is mounted on a bar 706. The merchandiser 700 is attached to the bar 706 by a support arm 704. The merchandiser 700 is slidable along the bar 706. In some embodiments, there is a locking means that when engaged limits the sliding of the merchandiser 700 along the bar 706. The product display merchandiser 700 includes a divider wall 705 and two pushers 708. The pushers 708 travel along tracks 703 and are urged towards the price channel or rail 750 by a biasing mechanism. A system of merchandisers 700 also includes end caps, which would have an end wall 705 with a single pusher 708.

The product display merchandiser 700 further includes a distance sensor 720 mounted on a fixed point on the divider wall 705. A retractable member 722 of the distance sensor 720 is attached to the pusher 708. Not visible in FIG. 7 is a second distance sensor 720 and retractable member 722 attached on the opposite side of the divider wall 705 in the same manner. As in previous embodiments, the distance sensor 720 can be mounted on the pusher 708, the divider wall 705, or any other fixed point. The distance sensor 720 can be a sting potentiometer as shown, or any other type of distance sensor disclosed herein. As in other embodiments, the distance sensor 720 communicates with an external computing device.

Figure 8:
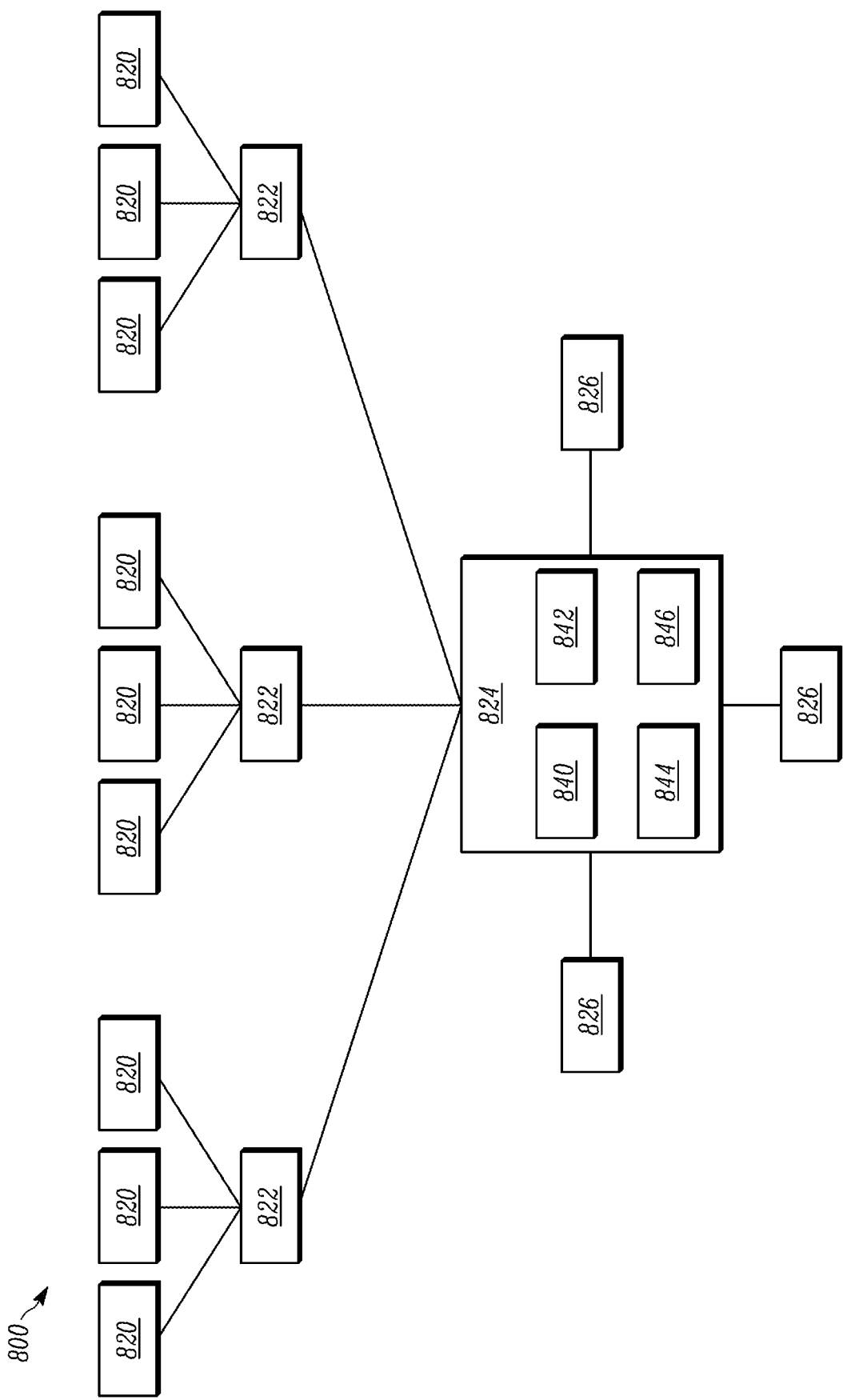
FIG. 8 is a block diagram illustrating a merchandise tracking system according to an embodiment of the present invention.

FIG. 8 is a block diagram illustrating a merchandise tracking system 800 according to an embodiment of the present invention. The merchandise tracking system 800 comprises a plurality of distance sensors 820, these distance sensors can be of any of the variety of sensors disclosed herein. In the embodiment shown, the distance sensors 820 are bunched together in groups of product display merchandisers 100 that contain the same product. Each group of distance sensors 820 are in communication with a local computing device 822. The local computing device 822 calculates the total number of the product contained in each product display merchandiser 100 in the group, and transmits that to a central computing device 824. In alternative embodiments, the individual distance sensors 820 communicate directly with the central computing device 824.

The central computing device 824 has a processor 840, a receiver 842, memory 844, and a user interface 846. The central computing device 824 receives data indicating the position of the pushers from the local computing devices 822, stores the received data in memory 844, and calculates the amount of a product sold from the position of the pusher over time.

The central computing device 824 is in communication with a plurality of remote computing devices 826 that are carried by store employees. When the central computing device 824 receives a signal indicating the need to restock a product, it outputs a message to the remote computing device 826 correlating with that product. In an alternative embodiment, there are no remote computing devices 826, and the external computing device merely outputs the message via a user interface.

The data collected by the central computing device 824 can be used for other purposes. In one embodiment, the data is used to track inventory for a store. This data can be used to reorder merchandise when inventory is low. The data can also be compared to data collected by checkout devices in order to calculate shoplifting or other merchandise loss.

Figure 9:
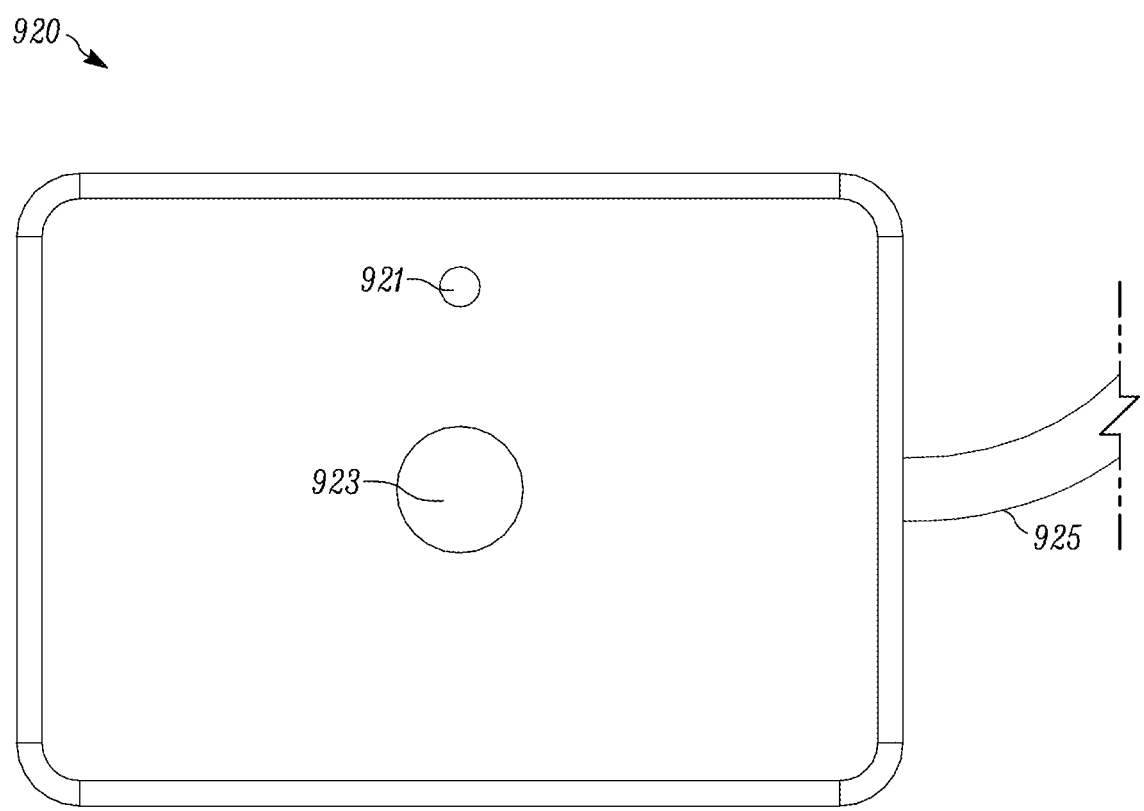
FIG. 9 is a front elevation view of a sensor in accordance with some embodiments of the invention for use in tracking product movement and/or produce levels within a merchandiser.

FIG. 9 illustrates an optical sensor, such as a laser sensor device 920, for use in the merchandiser systems described above. The sensor device 920 includes a light source 921 and light sensor 923. The light source 921 creates a pulse of light directed to an object, such as the back of the pusher 208 of the merchandiser 200. The light pulse is at least partially reflected back towards the sensor device 920 by the pusher 208, and is detected by the sensor 923. The sensor device 920 measures the amount of time between generating the light pulse and detecting the light pulse and from that calculates the distance between the sensor device 920 and the pusher 208.

In some embodiments, a target is coupled to the pusher 208 so as to move with it. The sensor device 920 is configured such that the light source 921 directs a laser at the target. The target is made of a material that reflects a large percentage of the generated light pulse back to the sensor 923, which improves the accuracy of the measurement. For example, the target could have a matte gray surface. In one form, the target is a matte grey sticker adhered to the back of the pusher 208. As discussed in above embodiments, the sensor device 920 can instead be mounted so as to move with the pusher, and configured to measure distance to a fixed portion of the merchandiser 200, such as the grid. In still further embodiments, the sensor device 920 is configured to measure the distance to the backmost product positioned in the tray 202.

The sensor device 920 includes at least one cord 925. The cord is configured to carry power and/or data to/from the sensor device 920. In one embodiment, both power and data are transmitted over separate wires in the same cord. In alternative embodiments, power and data are transmitted over the same wires.

Figure 23:
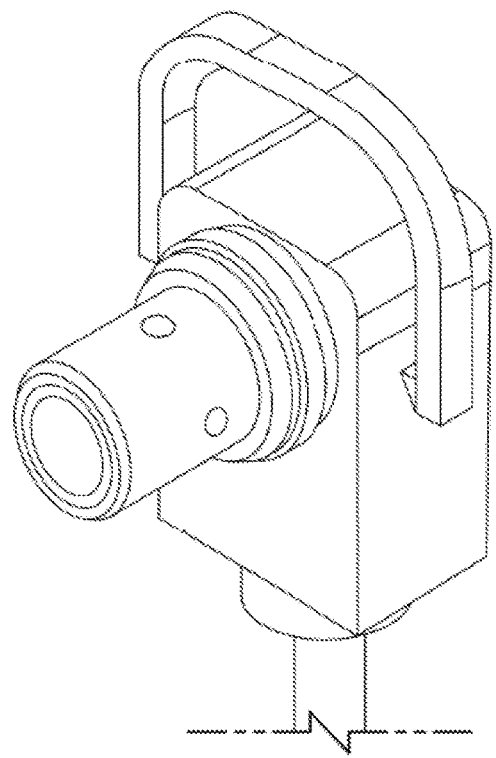
FIG. 23 is a perspective view of a connector, terminal or adapter that may be used to connect any of the above-mentioned sensors and/or modular adapters to a power source or supply and specifically illustrating a compatible connector for Hussman refrigerated units.
Figure 24:
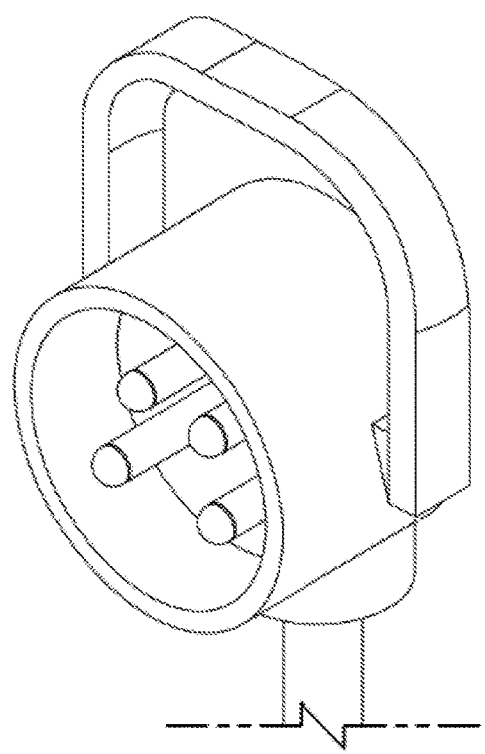
FIG. 24 is a perspective view of a connector, terminal or adapter that may be used to connect any of the above-mentioned sensors and/or modular adapters to a power source or supply and specifically illustrating a compatible connector for Hillphoenix refrigerated units.
Figure 25:
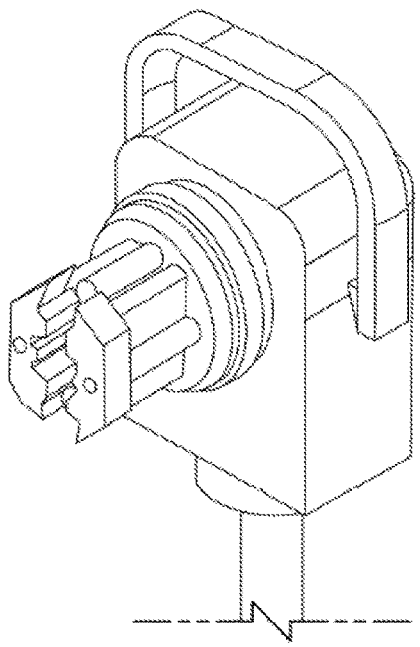
FIG. 25 is a perspective view of a connector, terminal or adapter that may be used to connect any of the above-mentioned sensors and/or modular adapters to a power source or supply and specifically illustrating a compatible connector for Hysor/Warren refrigerated units.
Figure 26:
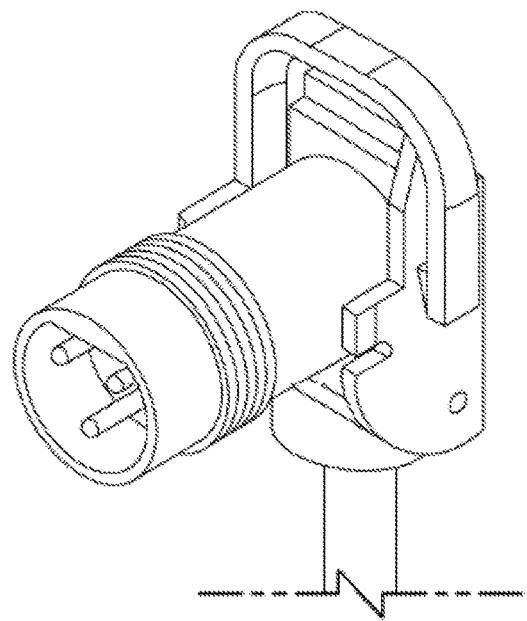
FIG. 26 is a perspective view of a connector, terminal or adapter that may be used to connect any of the above-mentioned sensors and/or modular adapters to a power source or supply and specifically illustrating a compatible connector for additional Hysor/Warren refrigerated units.

In some forms, the cord 925 only carries electricity to power the sensor device 920. In this form, the data is transmitted via a different means. The sensor device 920 may comprise a second cord over which data is transmitted. Alternatively, the sensor device 920 includes a wireless transmitter that wirelessly transmits measurement data to either a central computer or a more local gateway. The cord 925 has a connector at the free end for coupling to a power source. The power connector may comprise a plug configured to couple with a standard outlet or socket as would be found on or near a display, such as power sockets in refrigerated displays. Illustrations of such connectors for popular conventional refrigeration units such as those made by Hussmann, Hillphoenix and Kysor/Warren are illustrated in FIGS. 23-26. Specifically, FIG. 23 illustrates a Hussmann compatible connector, FIG. 24 illustrates a Hillphoenix compatible connector, and FIGS. 25-26 illustrate Kysor/Warren compatible connectors.

Figure 22:
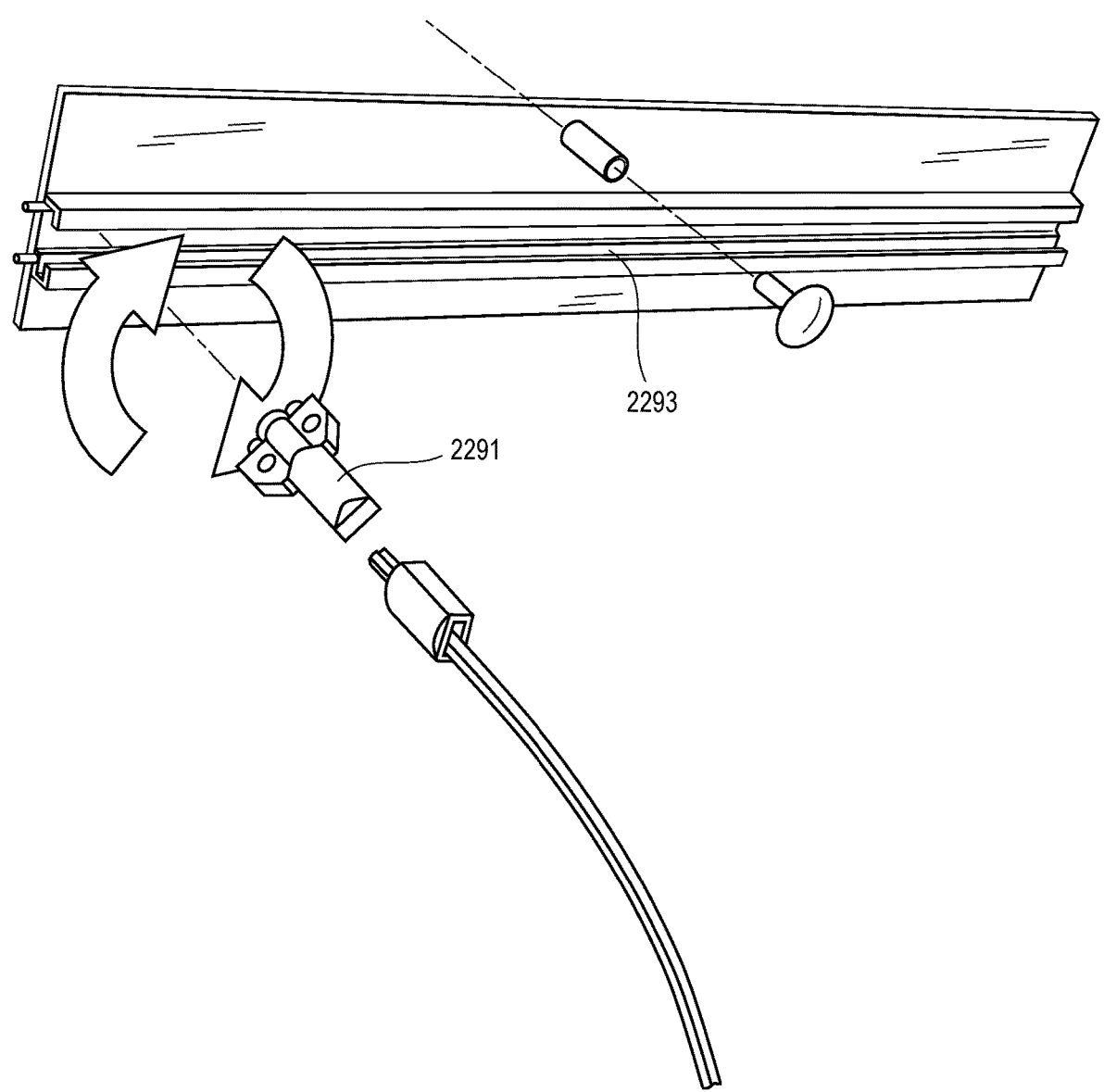
FIG. 22 is a perspective view of an exemplary power system that may be utilized with the sensors, adapters and merchandisers contemplated herein to supply power and/or transmit data to and from same.

Alternatively, the power connector may be configured to couple with a power channel in order to form an electrical connection between said power channel device 920. Exemplary connectors and power channels for use in a shelving systems are disclosed in U.S. Pat. No. 8,979,296, titled "ILLUMINATED SHELVING" and U.S. Pat. No. 9,204,736, titled SHELVING UNIT LIGHTING SYSTEM, which are both incorporated by reference herein in their entirety. In addition, although the preferred version has a electrical cable or cable harness that directly connects the sensor device 920 to a power source or supply, it should be appreciated that in other forms a modular configuration may be employed to connect the sensor device 920 to a power source so that just the connector or adapter needs to be changed to fit the desired refrigeration unit or case. An example of such a system is illustrated in FIG. 22, which has a connector 2291 that is configured to connect to a specific power source, such as low voltage power bus 2293 which forms an uninterrupted power channel to which the connector 2291 may be connected at any position there along. In alternative embodiments, instead of the cord 925 being connected directly to the sensor 920, power is supplied to the sensor 920 through an adapter mount as described below. In these embodiments, the power connectors described here may instead be utilized to provide power to the adapter.

In alternative embodiments, the cord 925 is removed. The sensor device 920 is powered wirelessly, such as through induction, and/or by an internal battery. In battery systems, the battery may be rechargeable by removing the sensor device 920 from the merchandiser 200 and coupling it to a charging station, and/or the battery may be removable such that it can be quickly removed and replaced with a charged battery.

Figure 10:
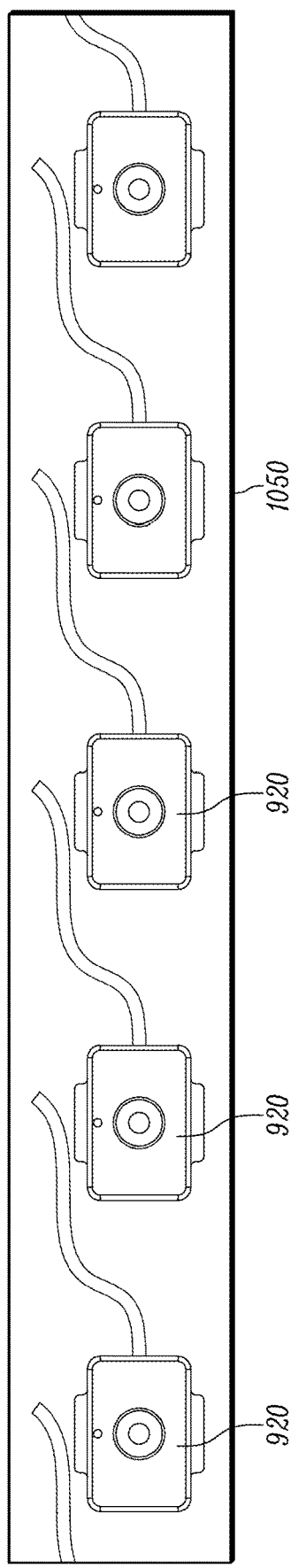
FIG. 10 is a front elevation view of a linear array of sensors in accordance with other embodiments of the invention for tracking product movement and/or product levels within a plurality of merchandisers (e.g., at least a portion of a row of merchandisers).

FIGS. 10-13 illustrate alternative mounting structures for the sensor device 920. FIG. 10 shows a plurality of sensor devices 920 mounted in a row on the plate 1050 of a shelving system. The row of sensor devices 920 are spaced so as to correspond with channels defined by dividers, such as in merchandiser systems 600 and 900. For example, in merchandiser system 600, a plurality of dividers 605 are spaced along a shelf 602 to define product channels. The row of sensor devices 920 shown in FIG. 10 is mounted at the rear of the shelf with each sensor device 920 being aligned with a corresponding pusher 608 or product channel. In some forms, the sensor devices 920 are adjustably mounted in the row, such that they can be horizontally adjusted relative to each other to accommodate product channels of different sizes. The may be adjustably mounted by being mounted in one of a plurality of mounts. Alternatively, the sensor devices 920 may include magnets such that they can be mounted anywhere along the length of a metallic plate 1050. In still further alternatives, the plate 1050 includes one or more channels in which the sensors devices 920 are slidably mounted.

Figure 11A:
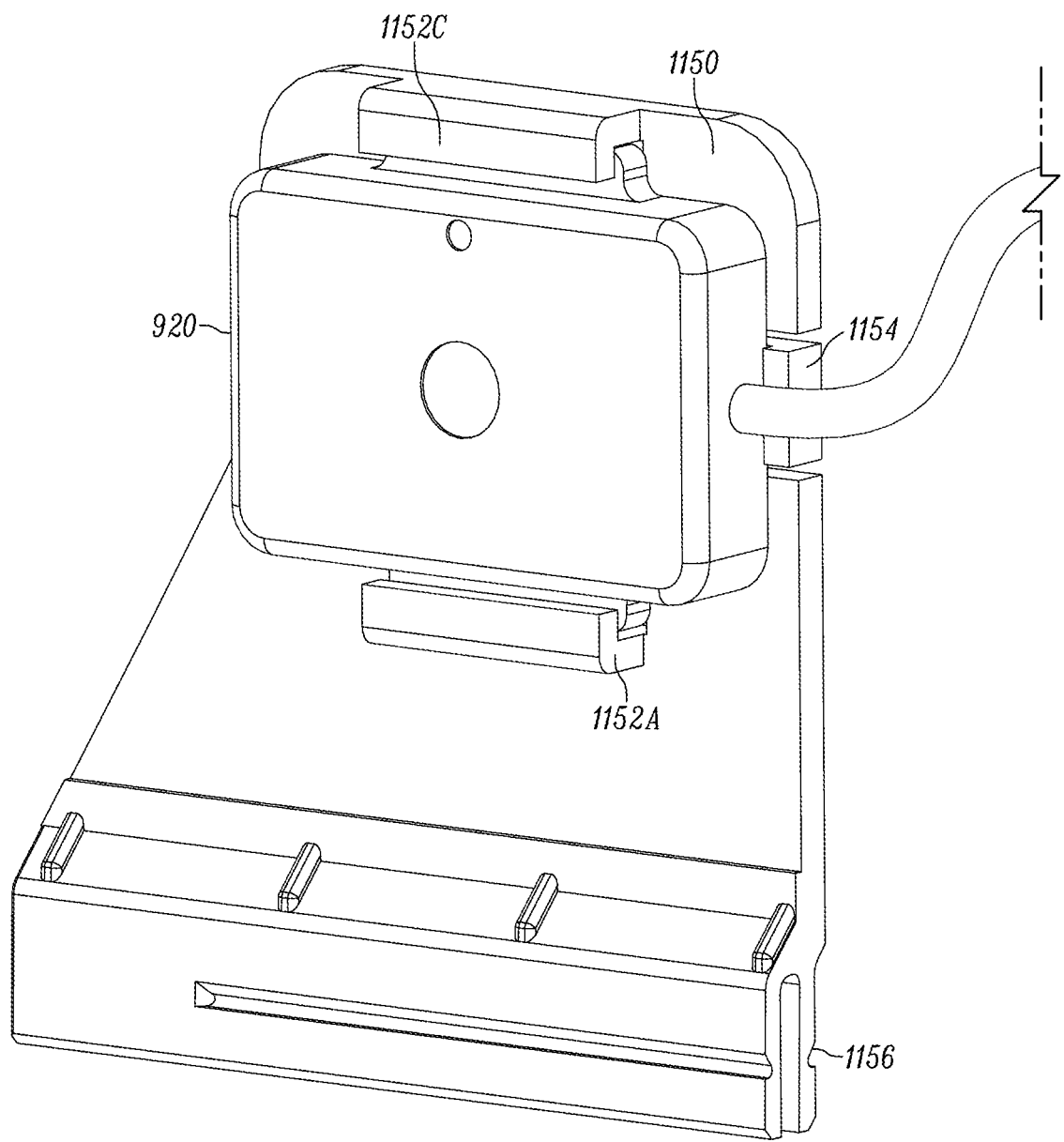
FIGS. 11A-B are perspective views of a modular adapter in accordance with some embodiments of the invention illustrating a merchandiser adapter and an accessory sensor connected to the adapter in FIG. 11A and removed from the adapter in FIG. 11B in order to illustrate exemplary mating structure for mating the sensor to the adapter.
Figure 11B:
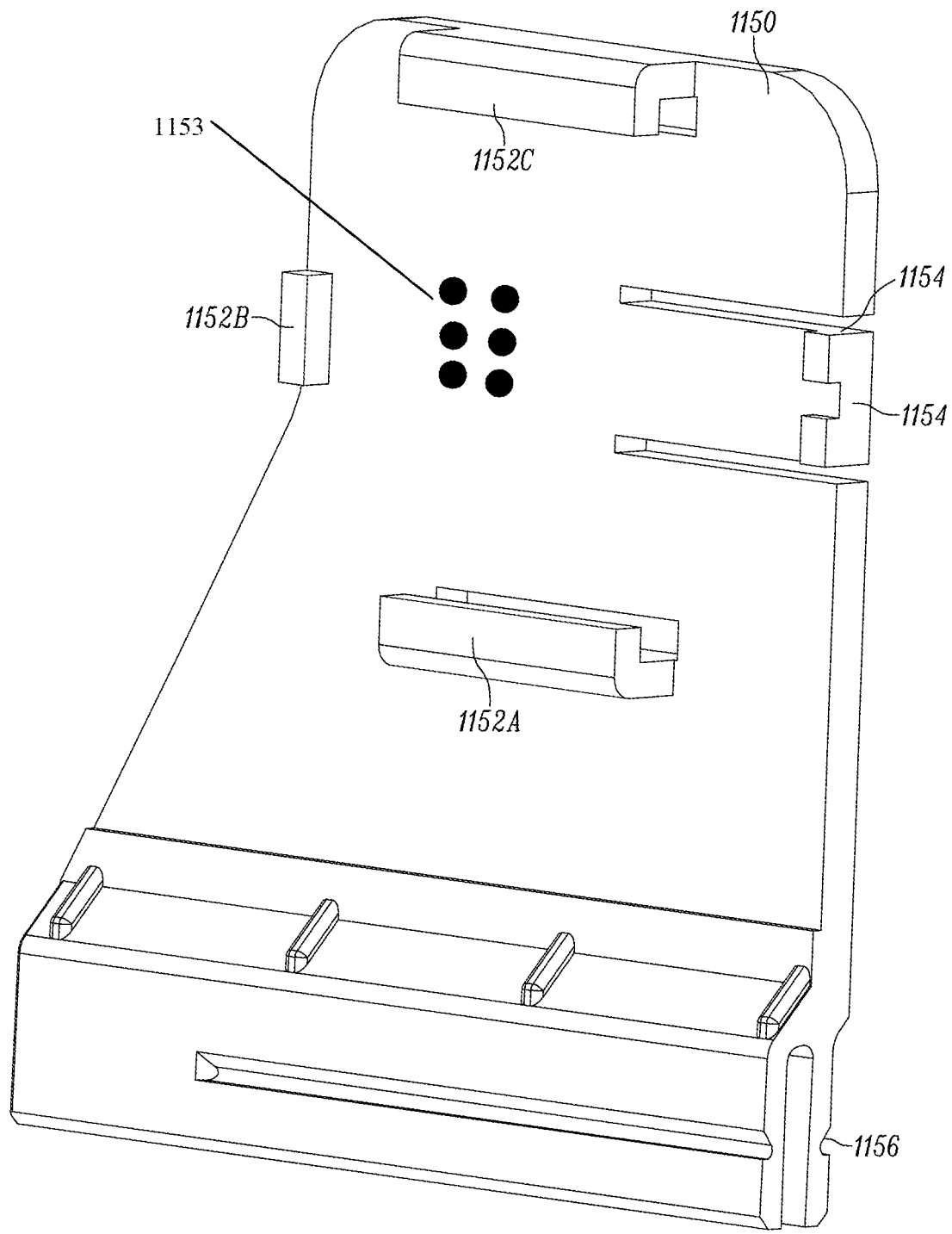

FIGS. 11A-11B illustrate a mount 1150 for the sensor device 920. The mount 1150 includes a plurality of projections 1152A-C configured to contain hold the sensor device 920 on three sides. As seen, the projections 1152A-C form channels with the back of the mount 1150 into which the edge of the sensor device 920 fits so as to secure the sensor from moving forward or backward. A fourth projection 1154 extends along the fourth side of the sensor device 920 to completely hold the sensor device 920 in place. The fourth projection 1154 is part of a deformable section 1155 of the mount 1150. The deformable portion 1155 can be moved from a first position, in which the projection 1154 extends to restrict movement of the sensor device 920, to a second position in which the projection 1154 is pushed back far enough to allow the sensor device 920 to slide in front of the projection 1154 to be removed from the mount 1050.

The mount 1150 further comprises an attachment section 1156 to attach the mount 1150 to a merchandiser system. The attachment section 1156 is a recess or channel configured to fit over a portion of a merchandiser. For example, the recess 1156 slides over a lip or wall at the back of the merchandiser to mount the sensor device 920 behind a pusher. In an alternative embodiment, the attachment section 1156 comprises a projection configured to fit into a recess or channel in the merchandiser. The mount 1150 further includes electrical connectors 1153. In one form the electrical connectors 1153 comprise ports, such as the 6 ports shown, configured to receive pins from the sensor device 920. The ports and pins of the electrical connectors 1153 form electrical connection through which data and/or power can be transmitted to and from the sensor device 920.

Figure 12:
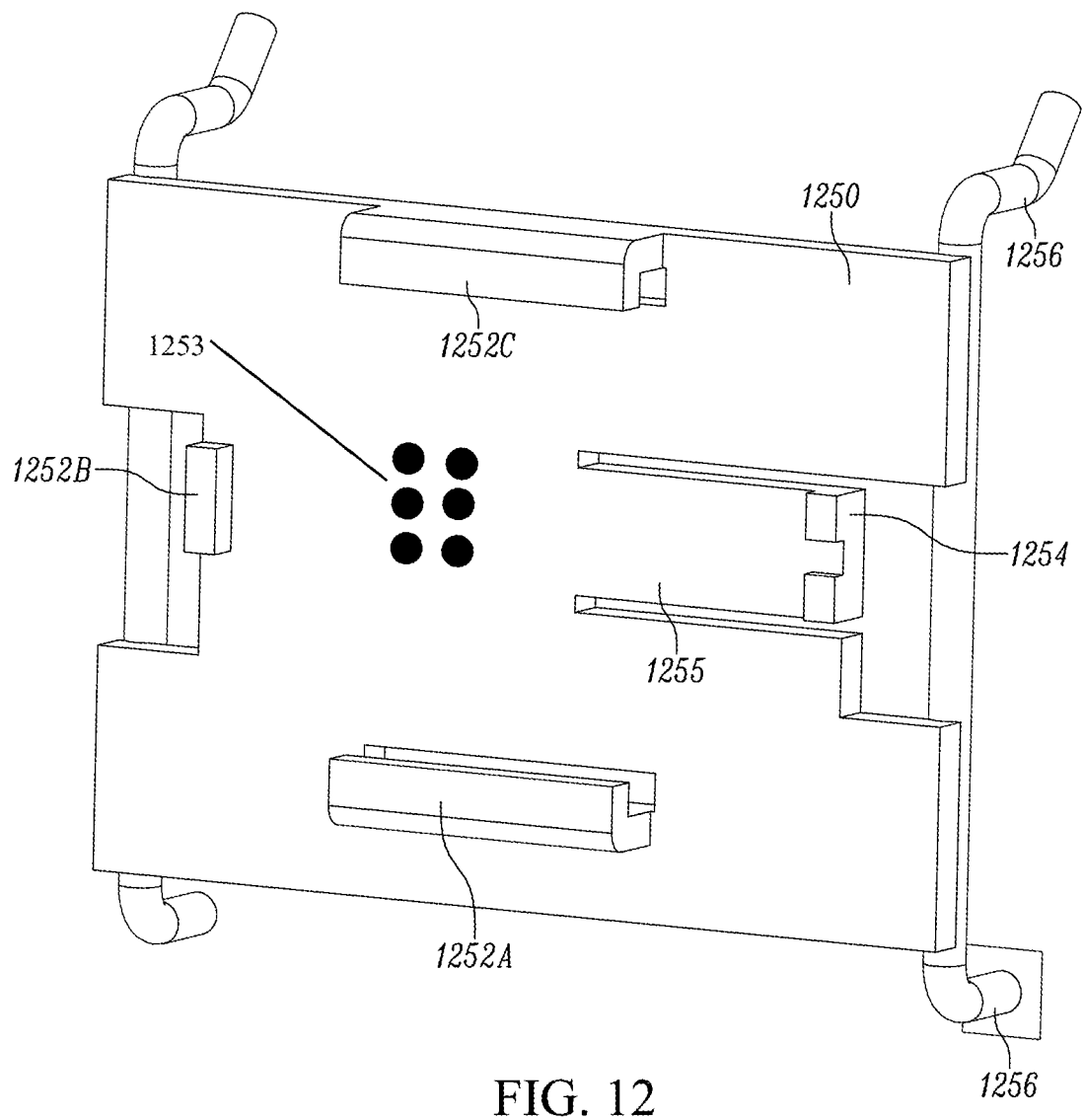
FIG. 12 is a perspective view of another modular adapter in accordance with other embodiments of the invention illustrating a peg board adapter with mating structure for attaching an accessory to the adapter.

FIG. 12 illustrates an alternative mount 1250 for a sensor device 920. The mount 1250 has projections 1252A-C and 1254 and a deformable section 1255 which together removably hold the sensor device 920 in substantially the same manner as the mount 1150. The mount 1250 includes attachment portions 1256 comprising projection configured to extend into a pegboard. By these projection, the mount 1250 can be removably mounted on a pegboard in line with a corresponding product channel.

Figure 13:
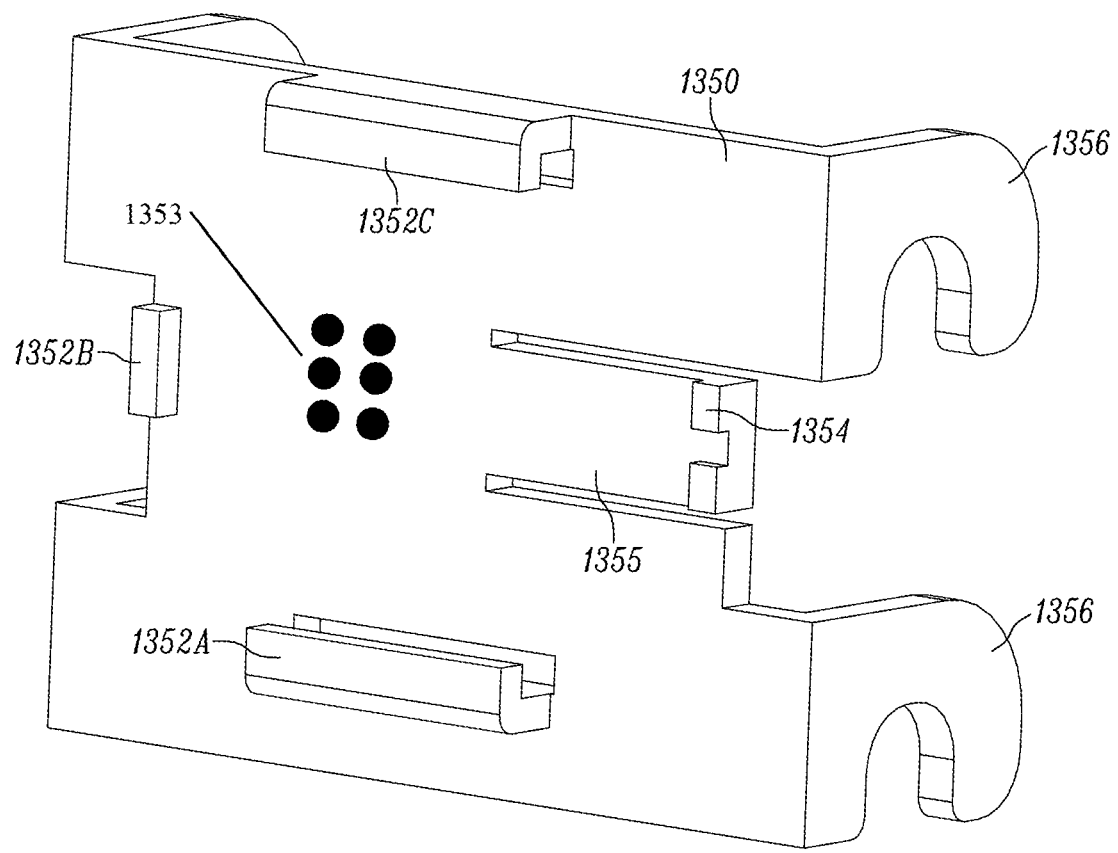
FIG. 13 is a perspective view of another modular adapter in accordance with other embodiments of the invention illustrating a grid adapter with mating structure for attaching an accessory to the adapter.

FIG. 13 illustrates an alternative mount 1350 which couples to a sensor 920 in substantially the same manner as the mounts 1150, 1250. The mount 1350 comprises an attachment portion 1356 comprising projection configured to hook over the horizontal bars of a grid, such as the grid 206 in FIG. 2A. Similar with the above, the mount 1350 is removably mounted on a grid 206 in line with a product channel or merchandiser.

Figure 14A:
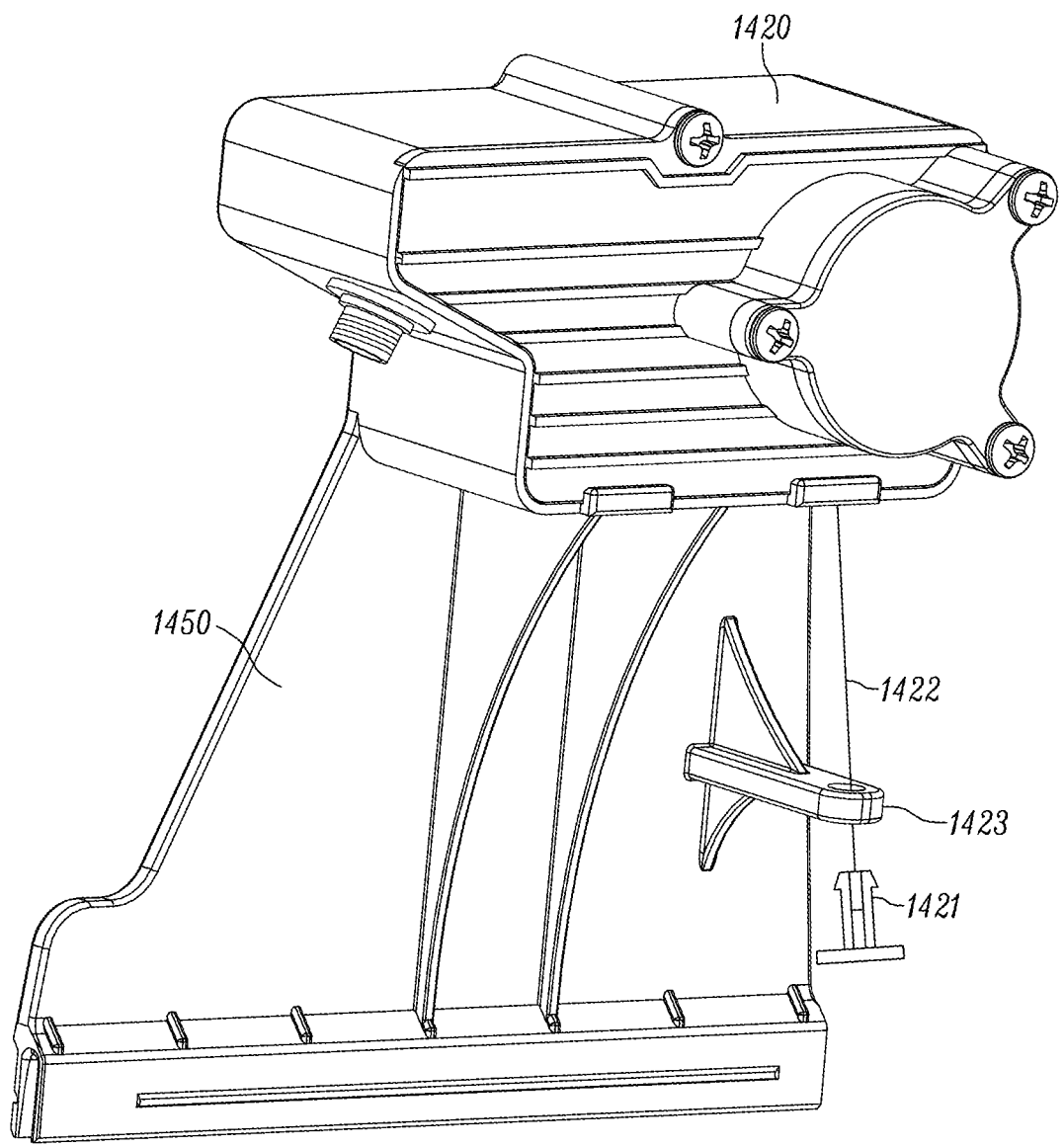
FIG. 14A-B are perspective views of another sensor in accordance with embodiments of the invention illustrating the sensor housing in FIG. 14A and the distal end of the string of the string potentiometer and one exemplary way in which it may be connected to a pusher in FIG. 14B.
Figure 14B:
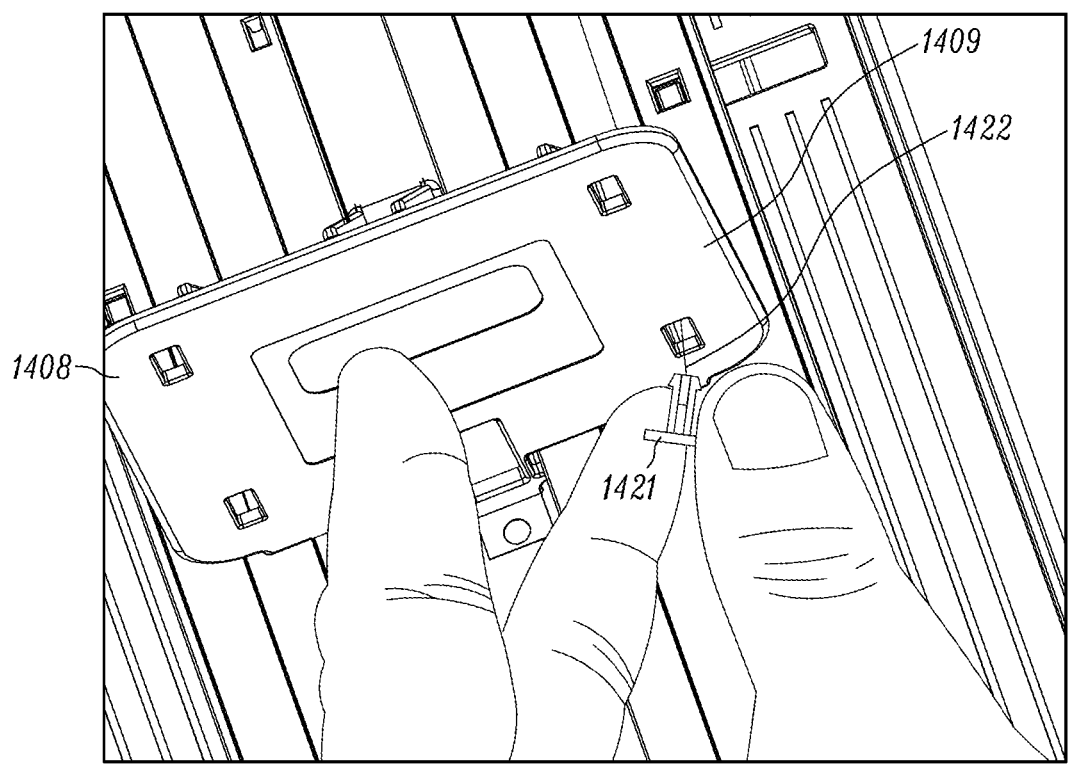

FIGS. 14A-B illustrate a sting potentiometer sensor device 1420 for use in the merchandiser systems described above. The string potentiometer sensor device 1420 operates in substantially the same way as the sting potentiometer sensor 120 described above. The retractable member 1422 comprises a sting or cord that unwinds from a spool inside the sensor device 1420. The retractable member 1422 passes through a guide 1423. The guide 1423 is made of a smooth material with rounded edges. The retractable member 1422 can be pulled in multiple direction from the guide 1423 with minimal wear and tear from rubbing together.

As shown in FIG. 14B, the retractable member 1422 includes an end piece 1421 configured to couple to a pusher 1408. The end piece 1421 fits in a hole 1409 in the pusher 1408. In some embodiments, the retractable member 1422 is passed through the hole 1409 and then coupled to the end piece 1421, with the end piece being larger than the hole 1409 so as to prevent the retractable member 1422 from being pulled back through the hole 1409 and decoupling from the pusher 1408. In alternative embodiments, the hole 1409 has an inconsistent cross section, such as a key-hole shape, so that the end piece 1421 is passed through a larger portion of the hole 1409 and then moved to fit into a smaller portion of the hole 1409 through which it cannot be pulled.

The sensor device 1420 further comprises a port 1425 to which a cord can be coupled. As with the sensor device 920, the sensor device 1420 may have a single cord for both power and data, separate data and power cords, only a power cord with data being transmitted wirelessly, or no cords. In the embodiment shown, the port 1425 is configured to receive a power cord, and the sensor device 1420 contains a wireless transmitter configured to transmit data.

The sensor device 1420 is mounted to a merchandiser by a mount 1450. The mount 1450 is substantially similar to the mount 1150, only configured to receive the sensor device 1420 instead of the sensor device 920. In alternative embodiments, the mount 1450 can be replaced with mounts with attachment portions similar to those of mounts 1250 and 1350. In still further alternatives, a plurality of sensor devices 1420 can be mounted in an array similar to the sensor devices 920 in FIG. 10.

In some embodiments, each of the sensor devices above include and internal processor for possessing the data measured by the sensors. For example, the processor converts the raw data, such as potential in a string potentiometer, to distance. In still further embodiments, the processor converts the distance into a number of products removed and/or a number of products remaining in the tray. The sensors may additionally include memory devices. The memory devices can store variables used in the processing of the data, such as the dimensions of the product used. The memory can further store data representing identifying information of the sensor, such as the location of the sensor and/or the product being displayed in the corresponding product channel or merchandiser.

The sensors further comprise transmitters. The transmitters may be wired transmitters configured to transmit data over data cables. Alternatively, the sensors contain wireless transmitters configured to transmit the measured and/or processed data. Wireless transmitters can be any type of wireless transmitter, such as Bluetooth/BLE, RF, RFID, WiFi, LoRa, etc. In some forms, the wireless transmitters transmit to a local gateway, such as a gateway for an aisle or a display case. The gateway receives the data transmitted by a plurality of sensors and then transmits it to a centralized computer, either the central onsite computer for an entire store or a remote server. In alternative embodiments, the transmitters of the individual sensors transmit directly the central computer. This data is the processed to both track inventory and for retail science operations. Exemplary uses of data collected by low product sensors is described in U.S. provisional application 62/447,547, filed on Jan. 18, 2017, which is incorporated in its entirety by reference herein.

Additionally or alternatively, the sensors control low product indicators located on or near the corresponding merchandisers. Exemplary low product indicators are described in U.S. patent application Ser. No. 15/409,193, filed Jan. 18, 2017, which is incorporated in its entirety by reference herein.

In addition to the distance sensors used to measure quantity of products, additional sensors may be integral with or coupled to the sensors described above. For example, temperature and/or moisture sensors can be mounted on merchandisers configured to display products sensitive to temperature, humidity, and/or moisture (such as frozen foods). In some forms, other sensors such as photo sensors (e.g., photoelectric sensors), motion sensors (e.g., proximity sensors, PIRs, movement sensors), optical pair sensors, RFID sensor, QR reader, bar code reader, sound sensors, airflow sensors, etc., may all be used with the embodiments disclosed herein. The additional sensors transmit data to the processor of the low product sensors described above. The processor, processes the additional data and then transmits it via the integrated transmitter. In still further embodiments, other devices beyond sensors may be used in conjunction with the embodiments disclosed herein. In some forms these are used in place of the sensors and in other forms they are used in addition to the sensors. For example, in FIGS. 15A-B, there is illustrated alternate sensors, devices and adapters in accordance with some embodiments of the invention.

Figure 15A:
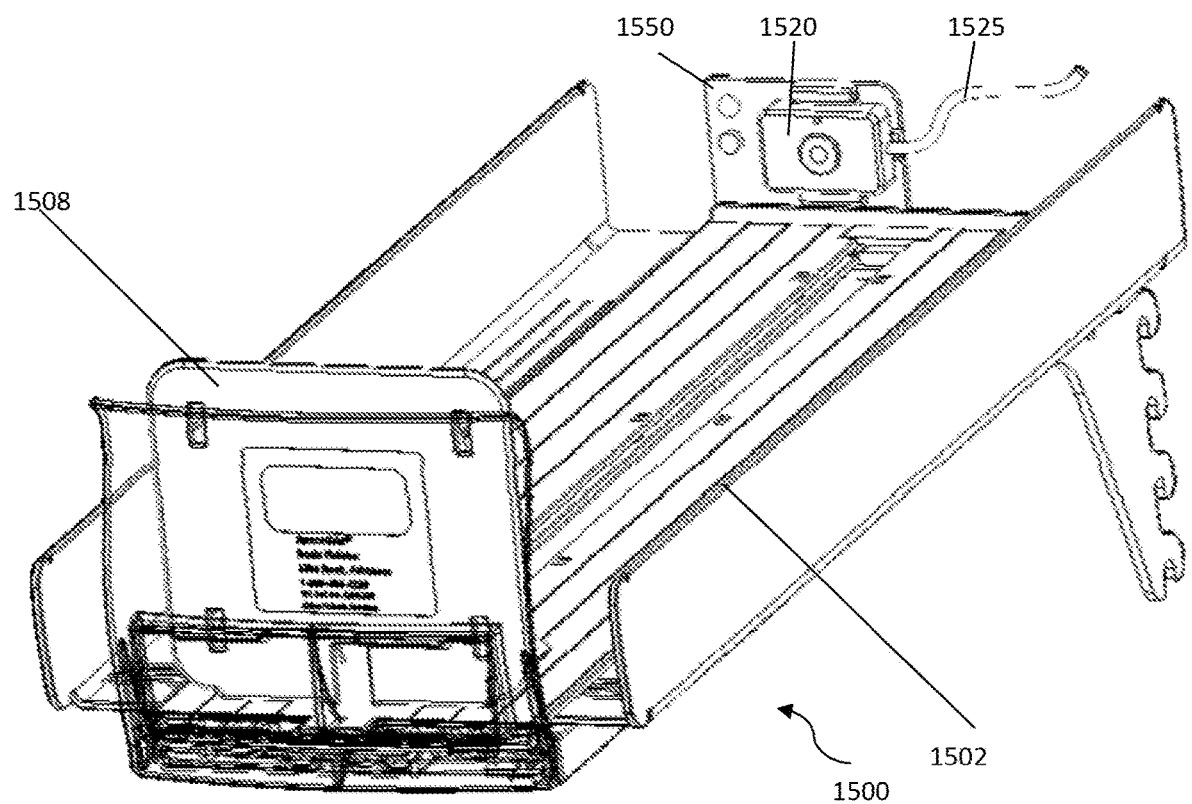
FIG. 15A-B are perspective views of other sensors and a modular adapter in accordance with embodiments of the invention illustrating the adapter connected to a self-facing or front-facing merchandiser via a merchandiser adapter in FIG. 15A and an enlarged view of the adapter and sensors in FIG. 15B.
Figure 15B:
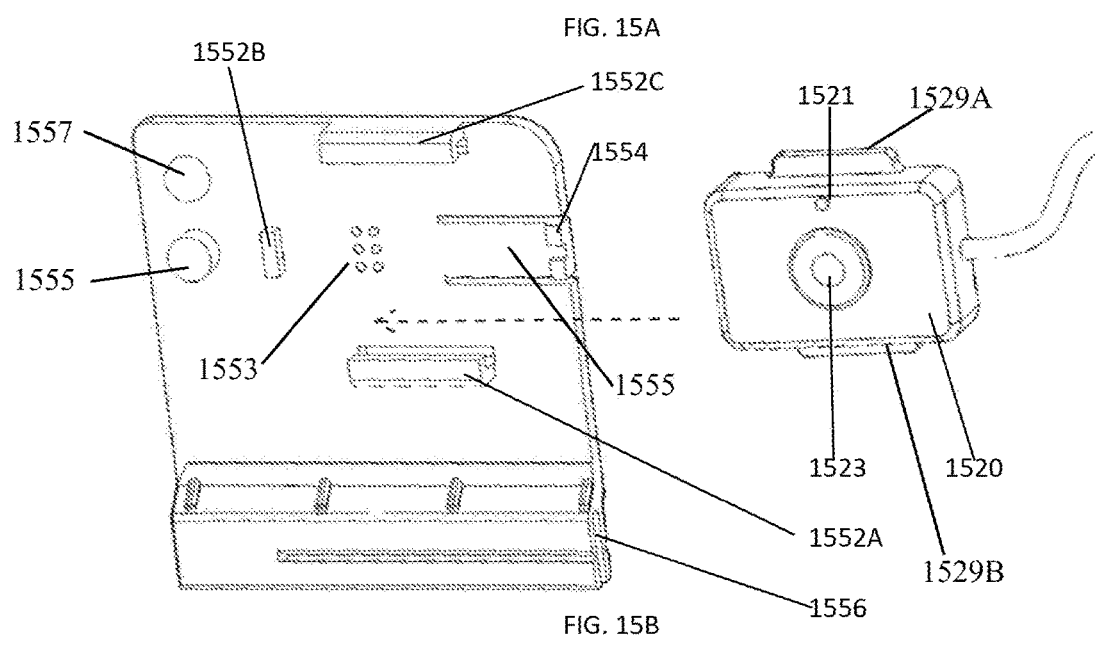

In keeping with prior practice, items that are similar to those discussed in prior embodiments above will utilize the same latter two-digit reference numeral but substitute the prefix 15 to distinguish the embodiment of FIGS. 15A-B from prior embodiments. In the form illustrated, the merchandiser 1500 is a tray type merchandiser, and specifically, a pull-out tray merchandiser. While the merchandiser 1500 is shown as a tray type merchandiser with a single product channel, it should be clear that alternate embodiments of the invention also contemplate including non-tray merchandisers and/or merchandisers with multiple product channels such as is disclosed in: U.S. Pat. No. 5,855,283 issued to Johnson on Jan. 5, 1999 and entitled Product Display (illustrating a tray with single product channel); U.S. Pat. No. 6,886,699 issued to Johnson on May 3, 2005 and entitled Merchandising System (illustrating a shelf management system with multiple product channels); U.S. Patent Application Publication No. 2010/0107670 A1 published to Kottke on May 6, 2010 and entitled Ventilated Merchandising System (illustrating a pull-out tray with single product channel); U.S. Patent Application Publication No. 2015/0157142 A1 published to Turner on Jun. 11, 2015 and entitled Universal Merchandiser and Methods Relating to Same (illustrating a shelf management system with multiple product channels); International Patent Application No. PCT/US16/43354 filed Jul. 21, 2016 and entitled Merchandiser and Methods Relating to Same (illustrating both single and multi-product channel merchandisers); U.S. Provisional Patent Application No. 62/302,664 filed Mar. 2, 2016 and entitled Multi-Facing Merchandiser and Related Methods (illustrating multi-product channel merchandisers); U.S. Provisional Patent Application No. 62/433,743 filed Dec. 13, 2016 and entitled Product Packaging and Dispensing Assembly and Related Methods; and U.S. Provisional Patent Application No. 62/447,547 filed Jan. 18, 2017 and entitled Merchandiser and Methods Relating to Same (illustrating multi-product channel merchandisers and rotatable merchandisers). All the aforesaid patents and applications being owned by Applicant and being expressly incorporated herein in their entirety.

In FIGS. 15A-B, the modular adapter 1550 includes a merchandiser mounting member 1556 and a first mating structure 1552A/B/C and 1554 for releasably/removably attaching or mating a device 1520 to the adapter 1550. In the form illustrated, the device 1520 is a distance sensor for detecting the distance of the product in the merchandiser from the sensor in order to determine product inventory level within the merchandiser and/or to track product movement. Unlike prior embodiments, however, the adapter 1550 further includes auxiliary components for use with the merchandiser. In the form illustrated, the adapter includes a light emitting device 1555, such as LED, and a temperature/humidity sensor 1557 (e.g., such as DHT11, DHT22, HTU21D, DS18B20 (all of which are digital and require power, ground, and 1 or 2 pins for digital communication with a microcontroller), TMP36 (an analog device requiring power, ground and signal), etc.). In this configuration, it is contemplated that the LED 1555 mounted on the adapter 1550 will be used to transmit a beam of light or signal that is not visible to the human eye (e.g., infrared, etc.), but is visible to an associate through an accessory, such as a handheld device or a head mounted or worn device such as goggles capable of receiving the non-visible beam of light or signal. The store associate will use this signal to detect when a merchandiser is low on product and needs restocking so that the lights located at the front of the merchandiser can be used for other purposes (e.g., illuminating the lens of the merchandiser to light-up product, draw attention to the merchandiser, and/or signify a sale or special; illuminating the lens a desired color to indicate the type of product contained therein (e.g., organic product, gluten free product, newly introduced product, etc.).

The other auxiliary device beyond the LED 1555 is the temperature/humidity sensor 1557 which is utilized to track temperature and humidity of the display or at least the merchandiser. One advantage to having such a sensor 1557 onboard the merchandiser is that it can be used to confirm that the display product has never dipped below or above a desired temperature. In some forms the LED 1555 may alternatively be used to illuminate a first color (e.g., green) so the store associate knows that the displayed product has stayed within the desired temperature range, at or below a desired temperature (or just below), or at or above (or just above) a specified temperature. Similarly the sensor 1557 can be used to do the same regarding humidity (e.g., confirming the product has not been subject to too much or too little humidity, has stayed within a desired range of humidity, stayed at or above a humidity threshold or minimum, at or below a humidity threshold or maximum, etc.). When the displayed product falls outside of the desired parameters, the LED 1555 could alternate to display a second color (e.g., red) to indicate this problem. An additional advantage of using the LED 1555 on the modular adapter 1550 is the discrete manner in which this information can be relayed to store associates. Because it is in the back of the merchandiser 1500 it forms a discrete alert system.

While the above configuration having a main product inventory sensor 1520 and auxiliary LED 1555 and temperature/humidity sensors 1557 is desirable, there are numerous other configurations intended to be covered by this disclosure. For example, in alternate embodiments, the main product inventory sensor may be replaced with a different device. This alternate device could be another sensor or it could be another electronic component such as a controller (e.g., microcontroller, etc.), a communication module (e.g., transmitter, transceiver, receiver, wireless communicator, wired communicator, etc.), a camera, a light, a speaker or other audible device (e.g., buzzer, etc.), a microphone or other sound detector, a display (e.g., LCD, LED, etc.), a switch (e.g., relay, transistor, etc.), input or output devices, motion sensors (e.g., PIR, etc.), proximity sensors, airflow sensor (e.g., anemometer, turbine, fan, etc.). In other alternatives, the LED 1555 may be replaced with another kind of discrete signal. Examples include sound emitters, signal transmitters, and vibration devices. While some of the above have been mentioned in the singular and others plural, it should be understood that single and plural of each discussed item is contemplated and covered by this disclosure. Similarly, in some examples sensors have been identified as a combined sensor (e.g., temperature/humidity), however, it should be understood that in alternate embodiments a single sensor (e.g., temperature or humidity) may be used if desired (e.g., when only one parameter detection is needed).

A unique benefit of having either a temperature sensor or an airflow sensor (or both) is that it allows the merchant or customer to check the performance of refrigerated and freezer displays. For example, merchandisers equipped with the devices discussed herein can utilize the information collected from those sensors to determine which portions of a refrigerated or freezer display or unit are not staying at the desired temperature or not receiving the desired airflow which may suggest that baffling should be added to the display unit to address this issue and/or it may be suggest to adjust the planogram in order to allow for better airflow and more consistent temperature. In other instances, it may suggest that the merchandisers should be repositioned in a more temperature and/or airflow friendly arrangement to ensure all product are being maintained within the desired temperature parameters. In still other instances, the data collected from the systems and apparatus disclosed herein may further allow the merchant or customer to determine which refrigeration or freezer equipment needs to be replaced next avoiding a situation where the merchant or customer replaces a perfectly good older unit when it has another unit that should have been replaced because it was underperforming or not performing as desired (or as well as the older unit). This information may also be helpful in determining if newer equipment under warranty should seek service calls while the unit is still under warranty.

This "systems health data" can be tracked and provided down to each merchandiser if desired, which will be of particular interest in displays containing high profit margin products. In some forms, the merchandisers may be supplied by a party that collects this data and provides reports on same to interested parties. In some instances this information will be tracked and stored in a database that can be accessed for a fee by the merchant/customer. This could be done for a reoccurring interval fee (e.g., monthly, quarterly or yearly subscription fee), may be done on a per time basis (e.g., fee per request), or may be done for a onetime payment to access to the database, etc. It also may entail providing information specific to the merchant/customer itself (meaning its stores equipment), or it may be offered to allow a merchant/customer to compare its store operations efficiencies to third party stores so as to note areas for improvement (e.g., our refrigerated units are working average or better than average, but the freezer units are under performing) and areas of success (e.g., who is the more green store based on energy efficiency, etc.). This data may also be tracked and used by or provided to refrigeration unit or freezer unit manufacturers for a fee to determine the performance of their own equipment and/or tout their performance over their competitors.

In still other forms, the system or apparatus will include a display for displaying additional information to a third party. For example, in some forms a display will be connected to the price channel of the merchandiser or on the adjacent shelving (if present) and capable of displaying product information (e.g., pricing, health/nutrition information, sales or other marketing/advertising). In some forms, an RGB LED display will be used such as WS2811, WS2812, WS2812b (all of which require power, ground and one pin for digital communication with a microcontroller). In forms involving communicating devices, any communication protocol may be used (e.g., I2C, SPI, SWD, 1-wire, UART, serial, Bluetooth, BLE, etc.).

In still further forms, a product display comprises a plurality of merchandisers each displaying the same product. Each merchandiser has a sensor as described herein having a microcontroller. The sensors communicate with each other in order to determine the total number of units of product contained in all of the merchandisers. When one merchandiser is low on products, but the total number of products is not at a restocking threshold, the sensor of the low merchandiser does not send a signal indicating a need to restock. In some embodiments, the sensor of the low merchandiser instead sends a signal indicating a need for redistribution so that voids in the planogram can be avoided.

In a preferred form, systems and apparatus in accordance with this disclosure will focus on modularity for each concept so that the merchandiser can be provided in any form the costumer (e.g., retail store, distribution center, warehouse, etc.) would like the merchandiser to be provided in. This allows the customer to customize its displays to its needs. For example, in areas where it would be helpful to have a product inventory sensor, the product can be equipped with such a device. In other areas where the customer would like a display equipped with auxiliary devices (e.g., sensors to check on or track temperature, humidity, etc.), the product can be equipped with such auxiliary sensors. This provides needed flexibility for the customer and needed flexibility for the merchandiser manufacturer or supplier so that a base platform of products can be developed and then customized (e.g., options added) as needed or desired by different customers.

In the form illustrated in FIGS. 15A-B, the adapter 1550 has mating structure 1552A/B/C and 1554 for mating with corresponding mating structure on the accessory to be attached to the modular mount. In one form, the adapter has two female structures 1552A/C for receiving male mating structures 1529A/1529B extending from the accessory 1520 to be connected to the module adapter 1550. In a preferred form, the adapter further includes a stop 1552B (e.g., end stop) for hindering further insertion of the accessory 1520 into or onto the modular adapter 1550. The adapter further includes a movable securing member 1554 for securing the accessory to the adapter once fully inserted into or onto the mating structure of the adapter. In the form shown, the securing member 1554 is a movable arm 1555 having at least one protrusion 1554 forming a lip or shoulder that extends around an end of the accessory 1520 to prevent inadvertent removal of the accessory 1520 from the adapter 1550. As illustrated, the securing member 1554 (e.g., arm) is movable between a first position wherein clearance is provided to allow the accessory 1520 to be connected to the adapter 1550 or removed therefrom and a second position wherein the securing member 1554 prevents inadvertent removal of the accessory from the adapter 1550. In a preferred form, the securing member 1554 is tapered, beveled or rounded on its outer edge or exterior side-wall so that a user can simply push the accessory 1520 onto the adapter 1550 resulting in the securing member 1554 automatically moving to the first position wherein clearance is provided to insert the accessory 1520 on the adapter 1550. Once the accessory 1520 is fully inserted on the adapter 1550 the securing member 1554 moves and preferably snaps back to the second position to confirm to the user the accessory 1520 is fully and correctly inserted on the adapter 1550. Then, to remove the accessory 1520, the user simply presses on the securing member 1554 or a structure connected thereto or in contact therewith to move the securing member 1554 to the first position so the accessory 1520 can be removed from the adapter 1550. In a preferred form, the securing member 1554 is sized to position the accessory 1520 so that its electrical terminals are properly aligned with corresponding electrical terminals 1553 on the adapter to supply power from the adapter to the accessory 1520 (either directly or indirectly such as through a battery as will be discussed further below).

Figure 16:
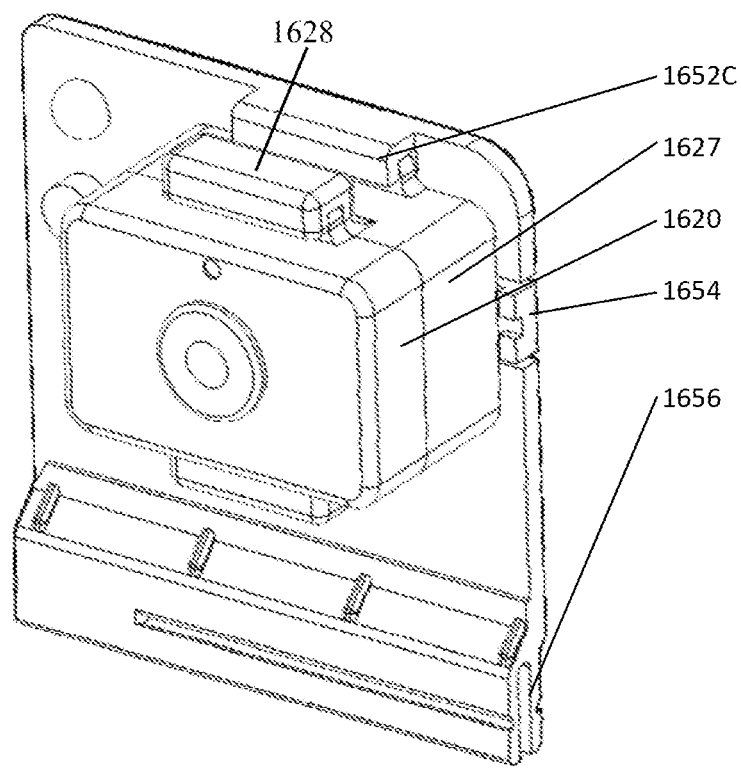
FIG. 16 is a perspective view of alternate sensors and modular adapter in accordance with embodiments of the invention with a battery connected via external mating structures to a main accessory.
Figure 17:
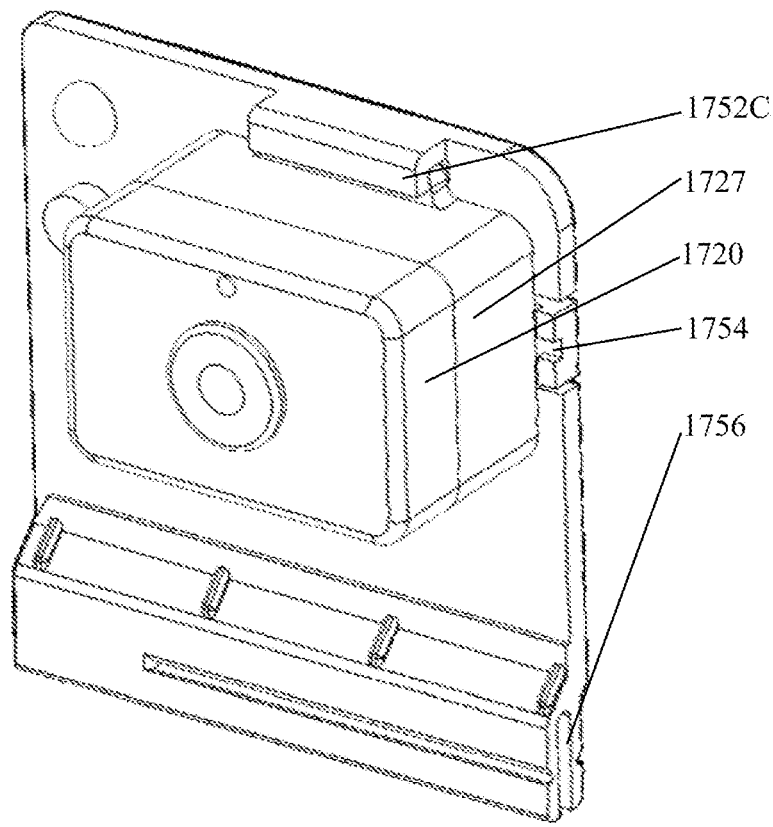
FIG. 17 is a perspective view of alternate sensors and modular adapter in accordance with embodiments of the invention with a battery connected via internal mating structures to a main accessory.

In FIGS. 16 and 17 alternate configurations are shown of battery equipped modular adapters. In FIG. 16 an optional battery 1627 or battery pack accessory is illustrated that has similar male mating structure for connecting with the female mating structure of the adapter 1650 and also includes a second set of mating structures 1628 for connecting another accessory 1620 to the battery accessory 1627. In the form illustrated the second mating structures 1628 of the battery 1627 are female mating structures for mating with corresponding male mating structures on the additional accessory 1620 (which in this case is a product detection or tracking sensor).

In FIG. 17, an alternate battery accessory 1727 is illustrated that has an internal mating structure for mating to the second or additional accessory 1720. In the illustrated form, the battery has male mating structures for connecting to the female mating structures of the adapter 1750, but then has protruding pins or recessed pin receptacles for mating with corresponding pin receptacles or protruding pins on the second or additional accessory. In some forms, the battery 1727 and second accessory 1720 may have both receptacles and protruding pins for connecting with mating pins and pin receptacles on the second accessory 1720. The internal mating structure or configuration of FIG. 17 may be desirable over the external mating structure of FIG. 16 for connecting the battery 1727 to the second accessory 1720 in instances where it is desired to minimize the space the accessories take-up and/or aesthetics warrant such an internal connection. It should be understood that the first or main accessory could also be connected to the adapter in a similar way if desired.

While the above embodiments of FIGS. 15A-B and 16 have discussed the adapter having female mating structure and the accessory having corresponding male mating structure, it should be understood that in alternate embodiments this may be revered (e.g., adapter with male mating structure and accessory with female mating structure) or each item may have alternate male and female mating structures that correspond to female and male mating structures on the other item. One advantage of providing a battery equipped system or apparatus like that disclosed herein is that it eliminates the need to supply power to the accessory. This is particularly true when dealing with a product display that is not located conveniently to a power source or wired for such power and/or in situations where only a few merchandisers are going to utilize power such that retrofitting the display to provide power would not be economical. This shows another benefit of the modular systems disclosed herein in that they can be configured for multiple display environments and offer features and options not available to customers at this time. Further, the modularity allows for existing displays (e.g., product shelving, merchandisers, etc.) to be retrofitted to offer the advantages of the technology disclosed herein without creating an insurmountable or expensive hurdle to overcome, such as requiring the conversion of an entire non-powered display shelf, gondola or display unit over to power.

Another benefit of the battery modules disclosed in FIGS. 16 and 17 is that these modules may be used with accessories that assist the customer in determining if the displayed product needs to be discarded due to a power outage or other event that has caused the customer's displays to lose power. This is particularly concerning when dealing with refrigerated or frozen foods. With conventional systems, retailers are typically required to discard product that may have spoiled due to a power outage or loss of power over an extended period of time. This is often due to the retailers not having the ability to individually check the temperature at each product merchandiser. With the battery operated systems and apparatus disclosed herein, the retailer can look at each individual merchandiser to determine what temperature the product displayed therein was subjected to during the outage. In some forms, the merchandiser may display the maximum or minimum temperature the merchandiser experienced over the recent past period of time or it may simply indicate via some form of visual indication whether the temperature of the merchandiser environment dipped below or rose above a predetermined threshold temperature. In most displays, temperature is not uniform throughout the display, thus, with merchandisers equipped with the technology disclosed herein the merchant or customer may be able to salvage some product in the display that the temperature sensor or other sensors employed indicate is still good product. Over time this can help a merchant or customer avoid discarding significant amounts of product at significant cost savings making the return on investment for such systems and apparatus much more attractive.

It should be understood that in some forms, the battery equipped modules such as those depicted in FIGS. 16 and 17 may be solely operated via battery. However, in other embodiments, these modules may simply serve as battery back-ups that continue to power the electronics of the apparatus or system in instances when power is lost (e.g., power outages due to storms, unplugging of a power supply, breakdown of the display, etc.). Regardless of which type of system is employed (e.g., battery only or battery back-up to mains power), the modular batteries of FIGS. 16 and 17 provide a configuration that is easy to pull out and swap batteries between the adapter and the accessory. This may be done to replace a battery or to simply allow for batteries to be charged. In some forms, the auxiliary accessory light utilized on the adapter may alternatively be used as a battery life indicator. For example, in one embodiment the light may be an LED that activates when the battery life is getting critically low. In other embodiments, the LED may gradually change color to indicate battery life (e.g., movement from green meaning charged to red meaning low battery life remaining, in other forms an intermediate color such as yellow may be used to indicate it has passed its half-life of remaining charge, etc.).

Figure 18A:
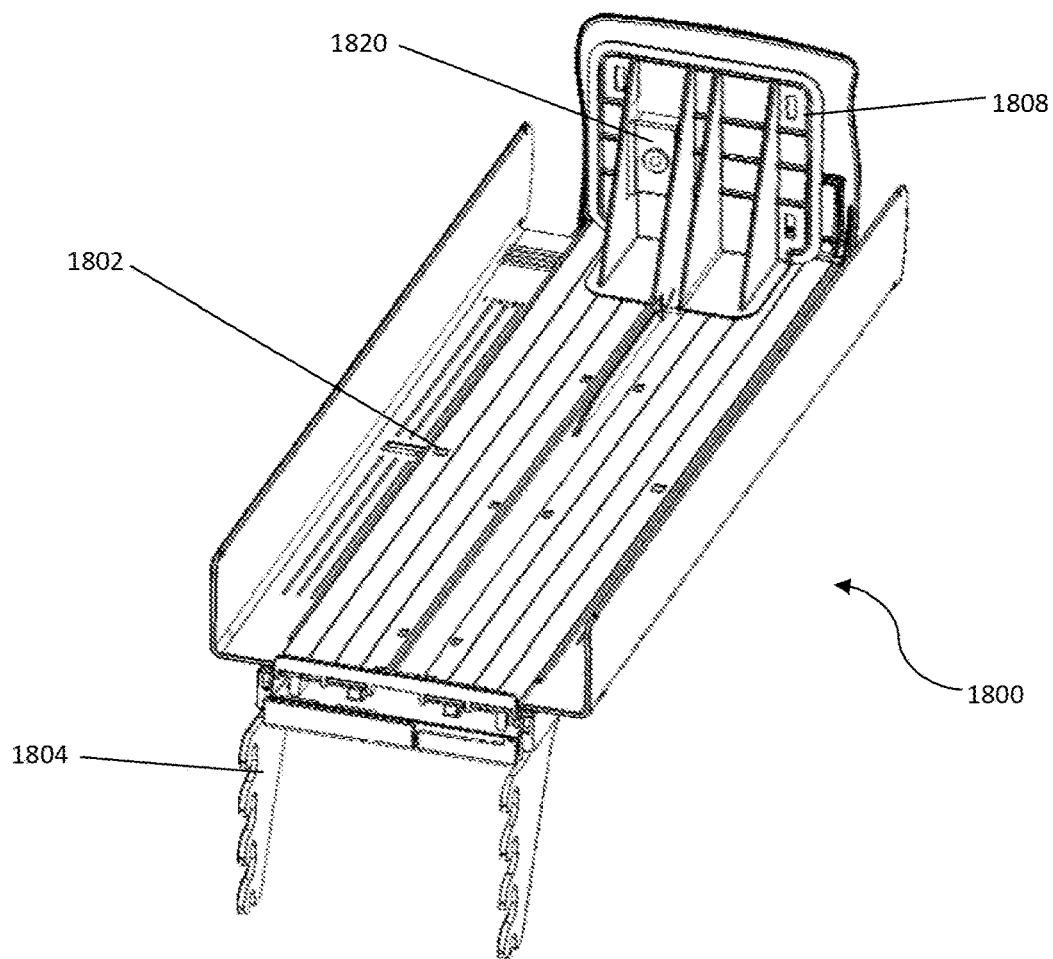
FIGS. 18A-B are perspective views of another sensor and a merchandiser with an integral modular adapter in accordance with embodiments of the invention illustrating the sensor connected to the integral modular adapter mating structure in FIG. 18A and exploded from the integral modular adapter mating structure in FIG. 18B to better illustrate the integral mating structure.
Figure 18B:
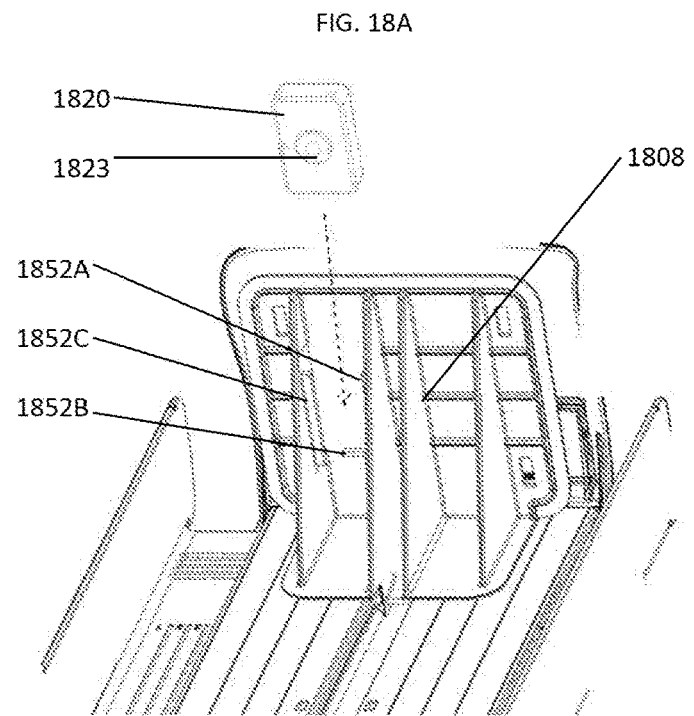

In the form illustrated in FIGS. 15A-B, 16 and 17, a merchandiser adapter is utilized to provide the modularity desired for the merchandiser or merchandise display. In FIGS. 18A-B, however, an alternate modular adapter is utilized to provide this same function. More particularly, in the form illustrated in FIGS. 18A-B, an integral modular adapter 1852A-C is provided in the form of integral mating structures added to the merchandiser 1800 itself to allow for optional items 1820 (e.g., devices such as sensors, etc.) to be added to the merchandiser as desired by a customer. These integral merchandiser mating structures 1852A-C allow for an accessory such as any of the ones discussed above (particularly with respect to the embodiments of FIGS. 15A-17) to be added as an option to the merchandiser if desired. In the form illustrated and as best seen in the enlarged partial view of FIG. 18B the pusher 1808 has protruding mating members 1852A-C that border three sides of the mating structure for defining a socket into which the accessory 1820 may be disposed. In the form illustrated, one mating structure protrusion 1852B extends from a bottom of the pusher to receive a lowermost surface of the accessory and two alternate mating structure protrusions 1852A/C extend out to form side walls that capture the sides of the accessory 1820 to retain the accessory on the merchandiser 1800 and, more particularly, on the pusher 1808.

While the embodiment illustrated shows the accessory mounted on the backside of the pusher (i.e., the side opposite the side that engages the product being displayed by the merchandiser), it should be understood that in alternate embodiments the accessory may be placed elsewhere on the merchandiser by locating the integral mating structure elsewhere on the merchandiser. In some forms, it may be desirable to locate the integral mating structure on the lens itself such as if the accessory is to contain a display itself that is desired to be displayed from the lens (e.g., behind the lens, in front of the lens, disposed within an internal recess or compartment n the lens, etc.). In other forms, it may be desirable to place the integral mating structure on one of the side walls (e.g., wings, side wires, dividers) of the merchandiser. In still other forms, it may be desirable to locate the integral mating structures on the base or tray of the merchandiser that extends from the base. In other forms, it may be desirable to form the integral mating structures on the mounting arms or support arms of the merchandiser (e.g., such as on the inner or outer side walls of one or more support arms connecting the merchandiser to a grid, bar, etc.). Lastly, in some forms, the integral mating structures will be formed by a combination of merchandiser components (e.g., formed by two or more of the side walls/wires, base, tray, support arms, lens, etc.). For example, it may be desirable to form the mating structures in one of the corners of the product channel such as between the lens and one of the side walls of the merchandiser. In other examples, the integral mating structures may be formed between the base and a rear wall of the merchandiser or between a rear wall and one of the side walls or even both side walls, etc.

While the embodiment of FIGS. 18A-B contemplates integral mating structures formed integral with the merchandiser via one or more of the merchandiser components (e.g., side walls/wires, base, tray, support arms, lens, etc.), it should be understood that in other embodiments, the mating structures may be formed separate from these components and attached thereto to perform the same function. Such attached mating structures are contemplated herein and intended to be covered by this disclosure as well.

Figure 19:
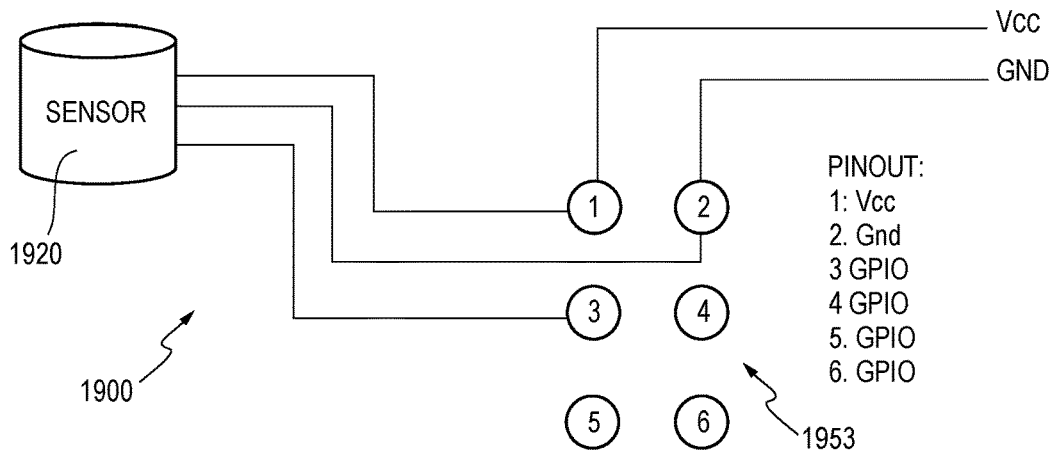
FIG. 19 is a wiring diagram illustrating how a single sensor may be connected to the terminals of the modular adapter and/or to an ultimate controller in accordance with the invention.
Figure 20:
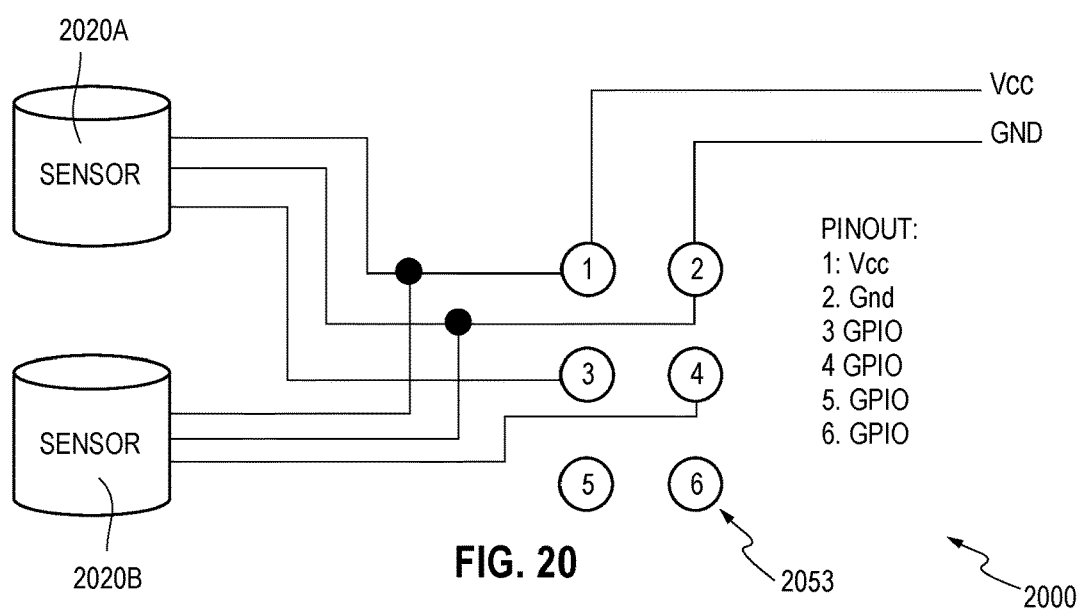
FIG. 20 is another wiring diagram illustrating how two sensors may be connected to the terminals of the modular adapter and/or to an ultimate controller in accordance with the invention.
Figure 21:
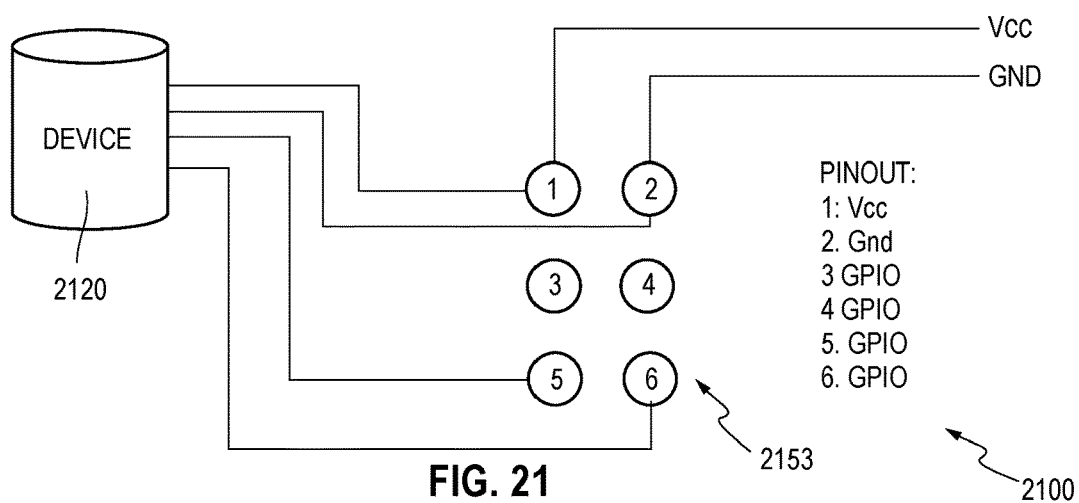
FIG. 21 is yet another wiring diagram illustrating how an accessory device may be connected to the terminals of the modular adapter and/or to an ultimate controller in accordance with the invention.

FIGS. 19, 20 and 21 illustrate various wiring diagrams that may be used to connect and operate the adapter and/or accessories disclosed herein. The embodiments disclosed herein could be connected to the system or apparatus in a variety of ways. For example, in a preferred form and as illustrated in FIGS. 11B, 12, 13 and 15B, the accessories will have six telescoping or depressible pins (e.g., pogo pins) for engaging six mating terminal pads or recesses on the adapters disclosed herein. In a preferred form, the pins extend out or protrude from the accessory only slightly and are beveled or tapered to make the pins easily depress back into the accessory as the accessory is connected to the adapter and then extending out or protruding once aligned with the mating terminals on the adapter in order to form an electrical connection or a complete circuit between the adapter and accessory. In other forms, however, it should be understood that any number of terminals may be used to interconnect the accessory and adapter depending on the functionality required of the accessory (e.g., anywhere from 2 to 10 pin connectors, or more). For example, if only power needs to be provided to the accessory than a two terminal connection will suffice (e.g., power and ground).

In FIG. 19 a single sensor accessory wiring diagram 1900 is shown for a digital or analog sensor 1920 having the six pin connector 1953 shown above. The diagram 1900 illustrates how the sensor 1920 would be wired to power (Vcc, pin 1), ground (GND, pin 2), and a general purpose input/output (GPIO, pin 3). Additional pins are available for additional accessories or replacement accessories that utilize more data or power lines. In FIG. 20 a two sensor accessory wiring diagram 2000 is shown illustrating how both sensors 2020A/B are wired to power and ground, but then each use their own general purpose input/output pin (i.e., 3 and 4 respectively). This configuration maintains pins available for additional accessories or replacement accessories. FIG. 21 illustrates a wiring diagram 2100 for a single device 2120 (e.g., an universal asynchronous receiver/transmitter (UART), serial component, inter-integrated circuit (i2c), SPI device, etc.) showing how it may be wired to power and ground, and to two separate communication pins (e.g., pin 5 and 6, respectively).

As mentioned above, in alternate forms, the telescoping pins could be located on the adapter and terminal pads on the accessory if desired. Similarly, in still other forms a combination of pins and pads could be located on each of the accessory and adapter if desired. In still other forms, other types of mating electrical terminals will be used (e.g., faston terminals, card edge connectors, FFC/FPC connectors, other pluggable connectors, wiring sockets, etc.).

In alternative embodiments, the data transmitted from a plurality of product display merchandisers 100 can be compared in order to analyze display effectiveness. Many product display merchandisers can be oriented at a variety of directions/angles in order to better display the product contained therein to potential customers. Additionally, various product display merchandisers 100 are placed at different levels on a shelving unit or different locations throughout a store. By tracking the amount of product sold from a variety or orientations or locations the most effective means of displaying a product can be determined.

In an alternative to any of the above embodiments, the distance sensor 120/220/etc. is replaced with a location sensor that detects the location of the pusher 108/etc. relative to the track 103/etc. This location sensor can comprise one or more optical sensors detecting when the pusher 108/etc. enters a certain position, one or more electromagnetic sensors (Hall Effect sensors or reed switches) along the track 103/etc. that detect a magnet attached to the pusher 108/etc., one or more momentary contact switches mounted along the track 103/etc. that are engaged by the pusher 108/etc. as it moves, or one or more open circuits along the track 103/etc. comprising contacts that interact with a conductive material on the pusher 108/etc. to close the circuits as it moves along the track 103/etc.

Example embodiments include the following:

Example 1 is a product display merchandiser comprising a track, a pusher configured to move along the track, a biasing mechanism configured to apply a force on the pusher in one direction along the track, and a distance sensor configured to detect the distance between the pusher and a fixed point.

The product display merchandiser of Example 1 can further comprise a transmitter configured to transmit the distance detected by the distance sensor to an external computing device. In one version of this alternative the transmitter transmits when the distance is within a predetermined range.

Alternatives include the product display merchandiser of Example 1, wherein the distance sensor is one of a string potentiometer, an infrared sensor, a laser and light sensor, an ultrasonic sensor, and a Hall Effect proximity sensor.

The product display merchandiser of Example 1, wherein the distance sensor is a string potentiometer comprising a retractable member attached to the pusher and a spool attached to a stationary portion of the product display merchandiser.

The product display merchandiser of Example 1, wherein the distance sensor is a string potentiometer comprising a spool attached to the pusher and a retractable member attached to a stationary portion of the product display merchandiser.

The product display merchandiser of Example 1, wherein the distance sensor is mounted on one of the track, a shelf, a wall, and a grid, and is configured to measure the distance from the distance sensor to the pusher.

The product display merchandiser of Example 1, wherein the distance sensor is mounted on the pusher and is configured to measure the distance from the distance sensor to a fixed point.

The product display merchandiser of Example 1, wherein the distance sensor is detachably fixed to the product display.

The product display merchandiser of Example 1 can further comprise a tray comprising the track and one or more arms. Wherein the tray is slidable along the one or more arms between a first position and a second position, and the distance sensor is configured to detect the distance between the pusher and a point on the tray.

Example 2 is a product display position detection system comprising a position sensor, a mount configured to removably attach the position sensor to a product display such that the position sensor measures a position of a pusher, and an indicator configured to indicate the position of the pusher.

Alternative to Example 2 include the product display position detection system of Example 2, wherein the indicator is one or more of a light, a wireless transmitter, and a wired transmitter.

The product display position detection system of Example 2, wherein the position sensor is one of a string potentiometer, an infrared sensor, a laser and light sensor, an ultrasonic sensor, and a hall effect proximity sensor.

The product display position detection system of Example 2, wherein the indicator indicates when the pusher enters a predetermined position.

The product display position detection system of Example 2, wherein the mount is configured to attach the position sensor to on one of a track, a shelf, a wall, and a grid, and the position sensor is configured to measure the distance from the position sensor to the pusher.

The product display position detection system of Example 2, wherein the mount is configured to attach the position sensor to the pusher and the position sensor is configured to measure the distance from the position sensor to a fixed point.

A product tracking system comprising a plurality of the display position detection systems of Example 2 and a central computing device having a processor, a receiver, memory, and a user interface. Wherein the central computing device receives data indicating the position of the pushers from the indicators, stores the received data in memory, and calculates the amount of a product sold from the position of the pusher over time. In some versions of this alternative the user interface outputs a signal when the pusher is in a position indicating a need for more products.

In view of the above disclosure, it should be understood that numerous embodiments of product sensors and product displays with product sensors are contemplated. In some forms the product sensors are capable of being used to retrofit existing product displays with product sensor technology, while in other forms, product sensing technology is integrated into the product display itself. One advantage to the non-integrated product sensors disclosed herein is that they may be utilized with the existing product displays a retailer currently owns or uses and, thus, do not require replacement of the entire product display. In some forms this retrofitting requires work to be done on the existing merchandisers with tools, while in other forms, the product sensors are configured to simply fasten or connect to existing displays without the need for tools (e.g., snap-on/snap-fit configurations, adhesive applications such as glue patches or adhesive tapes, magnetic connection, etc.).

In addition to the above-mentioned embodiments, it should be understood that a variety of methods are also disclosed herein. For example, a method of detecting product display inventory or product count is disclosed herein. As is a method for retrofitting existing merchandisers with product sensors. Other methods include methods for manufacturing or assembling on-shelf and off-shelf merchandisers with product sensors. Still others include methods of determining a parameter or status associated with a product merchandiser and/or methods for tracking product inventory in store merchandisers or product displays. These and other methods related to the subject matter set forth herein are intended to be covered by this disclosure. It should also be understood that while certain features have been described with certain embodiments, these features may be intermixed or interchanged with one another to form other embodiments as desired. All features disclosed herein are intended to be used in any of the embodiments disclosed herein either in lieu of similar features or in combination with other features.

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A product display position detection system comprising:
    a support structure;
    a product display having a rear portion supported on the support structure and a front portion angled downwardly relative to the rear portion, wherein the product display is configured for gravity feeding of one or more products in a direction from the rear portion toward the front portion;
    a modular adapter having a mounting member and a mating structure, wherein the mounting member is configured for repositionable engagement with a corresponding mounting member of the support structure;
    a position sensor removably engaged with the mating structure, the position sensor configured to detect a position of the product on the product display; and
    an indicator configured to indicate a position of the product.

2. The product display position detection system of claim 1, wherein the indicator is one or more of a light, a wireless transmitter, and a wired transmitter.

3. The product display position detection system of claim 1, wherein the position sensor is one of an infrared sensor, a laser and light sensor, an ultrasonic sensor, and a hall effect proximity sensor.

4. The product display position detection system of claim 1, wherein the indicator indicates when a predetermined position is detected.

5. The product display position detection system of claim 1, wherein the support structure is one of a shelf, a wall, and a grid.

6. The product display detection system of claim 1, further comprising:
    a plurality of one or more of a track, a shelf, a wall and a grid and combinations thereof;
    a plurality of position sensors removably engaged with a respective mating structure of a respective adapter, each position sensor configured to detect the position of a product on a respective one or more of the track, the shelf, the wall, and the grid; and
    a central computing device having a processor, a receiver, memory, and a user interface, wherein:
    the central computing device receives data indicating the position of the products from the indicators,
    stores the received data in memory, and
    calculates the amount of a product removed from the one or more track, shelf, wall and grid based on the position of the product over time.

7. The product tracking system of claim 6, wherein the user interface outputs a signal when the product is in a position indicating a need for more products.

8. The product display position detection system of claim 1 further including an indicator light.

9. A product display system comprising:
    a support structure;
    a product display having a rear portion secured to the support structure and a front portion angled downwardly relative to the rear portion, wherein the product display is configured for gravity feeding of one or more products in a direction from the rear portion toward the front portion;
    a sensor device having a housing; and
    a mount configured to removably couple the housing to the support structure,
    wherein the support structure includes a plurality of sensor mounting positions configured to removably receive the mount, and
    wherein in a first condition, the mount is coupled to a first sensor mounting position of the plurality of sensor mounting positions and in a second condition, the mount is coupled to a second sensor mounting position of the plurality of sensor mounting positions.

10. The product display of claim 9, further comprising an indicator, wherein the indicator is operated by the electrical device.

11. The product display of claim 9, wherein the mount comprises one or more magnets coupled to the housing.

12. The product display of claim 11, wherein the one or more magnets are configured to align with one or more corresponding magnets coupled to the support structure.

13. The product display of claim 9 further comprising at least one of a pin and a socket positioned on an exterior surface of the housing.

14. The product display of claim 13, the mount comprising the other of the pin and the socket, wherein the pin and the socket are configured to couple to form an electrical connection.

15. The product display of claim 13, wherein the at least one of a pin and a socket is configured to couple with at least one of a pin and a socket of the support structure to form an electrical connection.

16. The product display of claim 13 wherein the at least one of a pin and a socket is configured to conduct at least one of data and power.

17. The product display of claim 9 wherein the mount comprises:
a first projection, a second projection, and a third projection configured to abut a first side, second side, and third side of the housing respectively; and
a retainer snap configured to abut a fourth side of the housing, wherein the retainer snap is deformable to move from a first position in which the fourth side is abutted to a second position in which the fourth side is not abutted.

18. The product display of claim 17, wherein at least one of the first projection, second projection, and third projection form a channel into which a portion of the housing slides.

19. The product display of claim 9 wherein the mount is integral with the housing.

20. The product display of claim 9 wherein the mount is integral with the support structure.

21. The product display of claim 9, wherein the housing comprises at least one of a projection and a recess, wherein the mount comprises the other of a projection and a recess, and wherein the at least one of a projection and a recess of the housing is configured to couple with the other of a projection and a recess of the mount.

22. The product display of claim 9, the mount comprising an L bracket and at least one of adhesive, a magnet, adhesive tape, a screw, and a bolt.

23. The product display system of claim 9 further including a plurality of product displays each having at least two adjacent tracks or shelves and including a divider between adjacent tracks or shelves.

24. The product display system of claim 23, wherein the divider is removable.

25. The product display system of claim 9 further including an indicator light.

* * * * *

UNITED STATES PATENT AND TRADEMARK OFFICE
CERTIFICATE OF CORRECTION

PATENT NO. : 10,702,076 B2
APPLICATION NO. : 15/409396
DATED : July 7, 2020
INVENTOR(S) : Michael William Mercier et al.

Page 1 of 1

It is certified that error appears in the above-identified patent and that said Letters Patent is hereby corrected as shown below:

In the Claims

1. In Column 24, Line 30, in Claim 6, delete "display" and insert -- display position --, therefor.

2. In Column 24, Line 47, in Claim 7, delete "product tracking system" and insert -- product display detection system --, therefor.

Signed and Sealed this
Tenth Day of November, 2020

Andrei Iancu
*Director of the United States Patent and Trademark Office*